(12) United States Patent
Dolwin

(10) Patent No.: US 7,418,358 B2
(45) Date of Patent: Aug. 26, 2008

(54) DYNAMIC VOLTAGE CONTROLLER

(75) Inventor: Craig Dolwin, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/033,801

(22) Filed: Jan. 13, 2005

(65) Prior Publication Data

US 2005/0182578 A1    Aug. 18, 2005

(30) Foreign Application Priority Data

Jan. 26, 2004    (GB)    ................................. 0401631.7

(51) Int. Cl.
*G06F 19/00*    (2006.01)
(52) U.S. Cl. ...................................................... 702/78
(58) Field of Classification Search .................. 702/78; 377/19
See application file for complete search history.

(56) References Cited

U.S. PATENT DOCUMENTS

| | | | |
|---|---|---|---|
| 5,222,239 A | 6/1993 | Rosch | |
| 5,812,860 A | 9/1998 | Horden et al. | |
| 6,928,566 B2 | 8/2005 | Nunomura | |
| 2002/0116650 A1 | 8/2002 | Halepete et al. | |
| 2003/0115239 A1* | 6/2003 | Togawa | 709/102 |
| 2004/0123297 A1* | 6/2004 | Flautner et al. | 718/102 |

FOREIGN PATENT DOCUMENTS

| | | |
|---|---|---|
| EP | 0 978 781 A2 | 2/2000 |
| EP | 1 150 208 A2 | 10/2001 |
| EP | 1 321 855 A1 | 6/2003 |
| EP | 1 496 424 A2 | 1/2005 |
| JP | 2000-66776 | 3/2000 |
| JP | 2000-172383 | 6/2000 |
| JP | 2002-41308 | 2/2002 |
| JP | 2002-99432 | 4/2002 |
| JP | 2002-215599 | 8/2002 |
| JP | 2003-99148 | 4/2003 |
| WO | WO 00/20955 | 4/2000 |
| WO | WO 00/38038 | 6/2000 |

OTHER PUBLICATIONS

Flavius Gruian, "Hard Real-Time Scheduling for Low-Energy Using Stochastic Data and DVS Processors", Internet Document, XP002401638, Aug. 6-7, 2001.

* cited by examiner

*Primary Examiner*—Tung S Lau
(74) *Attorney, Agent, or Firm*—Oblon, Spivak, McClelland, Maier & Neustadt, P.C.

(57) ABSTRACT

A processing apparatus uses dynamic scaling of voltage (DVS) and includes a controller. This is particularly applicable to software defined radio (SDR), but may also be for other reconfigurable electronic systems. The controller includes a plurality of processing resources at least some of which have controllable supply voltage and/or frequency. The controller schedules operations on the resources, at least some of which have a predetermined deadline by which the operation must be performed, determines a voltage and/or frequency profile for an operation having a deadline, and instructs the resources to perform operations according to the schedule and the profile. The profile is determined by a voltage frequency profile calculator, for a processing resource for a predetermined task. The calculator determines metrics characterizing a probability distribution of cycle counts for completing the task using the resource, and determines a voltage profile for the next task depending on the metrics.

41 Claims, 12 Drawing Sheets

DYNAMIC VOLTAGE CONTROLLER

FIELD OF THE INVENTION

Background of the Invention

The present invention relates to processing apparatus utilising dynamic scaling of voltage (DVS), and in particular although not exclusively to a controller for such apparatus. Further, the present invention relates to a method and apparatus for determining a voltage and/or frequency profile for the processing apparatus. The invention is especially applicable to software defined radio (SDR), but is not so limited and may be applied to other re-configurable electronic systems.

Discussion of the Background

Basic dynamic scaling voltage DVS processing modules are currently available for example the Intel™ Speedstep™ technology applied to many laptop computers in which the processor is allowed to enter a "sleep" mode when not in use in order to reduce power consumption from the battery. Recently processing modules have emerged which are able to operate at a number of different voltage and frequency or clock speed rates. Power consumption in a processor is a function of both voltage and clock speed or frequency, and as is known a quadratic reduction in power consumption can theoretically be achieved by reducing both these parameters. Transmeta™ provides Longrun™ power management technology which adjusts the voltage and clock speed of a processor in order to ensure the processor minimises the amount of time spent in idle, in which the processor is "on" but not used for processing.

A problem with such approaches however is that they are not well suited to tasks with hard deadlines, for example ensuring that a data block received by a wireless terminal is decoded by a Viterbi decoder algorithm within a set number of milliseconds. Processing execution time deadlines for certain operations in such systems are often defined by standard protocols in order that, for example the terminal can interoperate with a base station in a wireless cellular or local area network.

Many of the tasks or operations in devices or systems such as wireless terminals operate according to one or more standards and can be implemented in a number of ways, for example by using specialised hardware accelerators such as ASIC's or by using a digital signal processor which is configured according to software. Often some of the processing or tasks overlap in time or are independent of other tasks and can therefore be performed in parallel, allowing the processing resource to allocate a slice of processing power to one task and another slice to another task. This might be achieved using multiple processors or timeslicing a resource such as a microprocessor for example.

Various methods of scheduling the processor time for a number of tasks are known in the art. Modifying such scheduling methodologies to incorporate the concept of reducing the voltage-frequency of the processing resource when dealing with certain tasks in order to reduce power consumption, is described in conceptual terms in Flavius Gruian "Hard Real-Time Scheduling for Low-Energy Using Stochastic Data and DVS processors", ISLPED'01, Aug. 2-7, 2001. However the practical implementation of such a system is non-trivial.

SUMMARY OF THE INVENTION

In general terms in one aspect the present invention provides a voltage profile calculator for determining a voltage profile for a processing resource for a particular task. This can then be applied to the resource next time the task is to be carried out, in order to minimise the power used by the resource in carrying out the task (on average). The calculator comprises means for determining a number of metrics characterizing a probability distribution of cycle counts for completing the task. The distribution could be determined by recording previous cycle counts required to complete the task, thus giving a historical record. The metrics could be mean and standard deviation, although other metrics may be used if the distribution is non-standard as is likely in a practical system. Preferably an upper and lower bound (Cmax and Cmin) are defined within which a predetermined percentage (P) of the cycle counts are located. These metrics then characterise a simplified distribution.

The calculator preferably also comprises means for determining the voltage profile from these metrics. Using the simplified metrics together with a simplified voltage profile containing phases of fixed voltage, simplified equations can be used to determine these voltages and the times for switching between them. Such an arrangement is simple to implement in a practical system.

In particular in one aspect the present invention provides a voltage-frequency profile calculator for determining a voltage and/or frequency profile for a processing resource for a predetermined task, the calculator comprising: means for determining a number of metrics characterising a probability distribution of cycle counts for completing said task using said resource; means for determining frequency and/or voltage profiles for a next said task dependent on said metrics. Preferably the frequency and/or voltage profiles a number of fixed voltage phases and have step voltage changes. Alternatively, the profile could be defined by one or more non-linear functions such as a fixed voltage gradient.

Simple frequency and voltages changes over the task duration are easier to implement than a continuously (albeit ideal) profile. In one embodiment the metrics are mean and standard deviation for a standard distribution, however other metrics may be used in relation to other known distribution types or shapes. For example the metrics may be determined by recording previous cycle counts and performing the necessary calculations on this historical data. The voltage and frequency profiles may then be determined using look-up tables for the distribution type, and conversion equations between the voltage and frequency values.

In particular in another aspect the present invention provides a voltage-frequency profile calculator for determining a voltage and/or frequency profile for a processing resource for a predetermined task, the calculator comprising: means for determining a number of metrics characterising a probability distribution of cycle counts for completing said task using said resource; means for determining a voltage profile for a next said task dependent on said metrics; wherein the profile has two or more phases or sections each having a different fixed voltage over its duration.

In one embodiment there are three such phases each with a different voltage. The voltage tends to start off low, and increase in steps as the duration approaches the deadline for completing the task. Using a stepped voltage profile is much easier to implement than a continuously changing one, and is also more efficient as increasing the frequency of operation typically requires increasing the voltage and there is a delay while this occurs, making frequent changes in voltage inefficient. Having a limited number of fixed voltage phases also makes the calculation of these voltages easier compared with a continuously varying voltage which may need to be calculated every clock period. Again this reduces implementation complexity.

The term fixed voltage is used to refer to a voltage which is substantially constant over the corresponding phase. Minor variations in the voltage may occur, for example due to noise and drift.

The metrics determining means may comprise means for determining the type of said distribution, for example Guassian, and corresponding metric types such as mean and standard deviation for Guassian. Metrics characterising the determined distribution type can then be calculated, for example the mean and standard deviation are readily calculated form the previous cycle count history.

Alternatively the metrics determining means may comprise means for characterising a simplified distribution corresponding to said cycle count distribution and determining said metrics from said simplified distribution. A simplified distribution is an approximation to the actual distribution which can then be readily defined by a number of metrics. For example the actual distribution may be characterised by a number of linear functions, in other words sections or phases of fixed probability density (ie the probability for a range of cycle counts) extending over the maximum duration of the task. As a further alternative, the distribution may be characterised by phases of fixed (or varying) gradient probability distribution.

In the case of a series of linear functions, the metrics can be the bounds of probabilities of each linear function or phase. In a preferred embodiment with three phases, the metrics comprise a lower bound and an upper bound defining a predetermined percentage of the cycle counts in the distribution. The percentage may depend on the expected distribution, or it may be determined experimentally. In practice a percentage of 90-95% has been found sufficiently accurate, although other ranges could be used.

The distribution metrics determining means may comprise means for recording the cycle counts required to complete said task by said resource on previous occasions. Alternatively, it may comprise means for receiving predetermined metrics, for example from a manufacturer of the resource who may supply the distribution type and corresponding metrics, or a number of "pre-recorded" cycle counts for producing a simplified distribution. The means may also comprise a combination of these, for example starting with what is provided by the manufacturer and modifying as real cycle count data is recorded.

Preferably the voltage profile determining means comprises means for calculating a cycle period for each said phase. This is achieved using the determined metrics which make these calculations easier, and also requires fewer calculations.

Preferably the voltage profile determining means also comprises means for scaling the cycle period if the un-scaled cycle period is not supported by the resource. This can be used in the case where the resource does not support a high enough frequency of operation to support the lowest cycle period determined. In this case this cycle period is scaled to increase its period, preferably to the maximum supported by the resource. The preceding higher cycle periods must also be scaled to compensate.

Where the timing for instructing the resource to change frequency/voltage is external to the calculator, then the voltage profile determining means also comprises means for determining the time to change from one cycle period phase to another, based on the external time.

Where the calculator is also providing a voltage profile, the voltage profile determining means comprises means for converting the cycle period for each said phase into a voltage level for each said phase.

There is also provided a controller for a processing apparatus having a plurality of processing resources, at least some of said resources having controllable supply voltage and/or frequency; the controller comprising: means for scheduling operations on said resources, at least some of said operations having a predetermined deadline by which the operation must be performed; means for calculating a voltage or frequency profile according to the definitions above; and means for instructing the resources to perform said operations according to said schedule and said profile.

In particular in another aspect the present invention provides a voltage-frequency profile calculator for determining a voltage and/or frequency profile for a processing resource for a predetermined task, the calculator comprising: means for determining a number of metrics characterising a probability distribution of cycle counts for completing said task using said resource; means for determining a voltage profile for a next said task dependent on said metrics; wherein the metrics characterise a simplified distribution.

Using a simplified probability density function (PDF) rather than an actual one reduces the complexity and number of calculations required to determine the voltage profile. Preferably this simplified distribution is a stepped PDF having two or more phases of fixed probability density. Preferably the metrics comprise a lower bound and an upper bound defining a predetermined percentage of the cycle counts in the distribution. A percentage of between 90 and 95% have been found effective in determining a voltage profile having a good efficiency in terms of minimising the power, on average, required by the resource.

The distribution metrics determining means may record the cycle counts required to complete the task by the resource over time, thus building up a historical record from which the metrics can be derived. Alternatively or in addition, the distribution metrics determining means may simply receive predetermined metrics, for example determined at manufacturing time. These may be modified as a historical record is built up. A further advantage of having a historical record is that conditions relating to performance of the task may change, for example the channel conditions in a wireless receiver or the co-users of the resource thus changing the sharing pattern which may affect the cycle count distribution. For example the average may increase as greater contention for the resource is experienced.

The voltage profile may then be used by a controller of one or more reconfigurable resources for example. The controller can then use the profile to operate the resource at voltages according to the profile in order to perform the task.

In general terms in another aspect the present invention provides a controller for a processing apparatus having multiple processing resources at least some of which have controllable voltage and/or frequency operational parameters. The controller comprises or accesses an operations datastructure comprising a number of execution parameters for each operation the apparatus is to perform. In a wireless terminal or base station for example this will be known in advance for given protocols, and the controller may be re-configurable in order to deal with new protocols. The execution parameters for each operation may comprise a voltage-frequency profile, a start time, worst case cycle count, and actual execution cycle count statistics for previous executions of the operation. These statistics are preferably updated over time as the operation is performed numerous times in order to provide a historical statistical basis for parameters such as average execution cycle count. A voltage-frequency profile calculating means provides or periodically updates the stored voltage-frequency profile for each operation based on these parameters. The voltage-frequency profile is arranged to minimise power consumption for each operation, for example by having the processing resource performing the operation initially at a low voltage-frequency, then only if the operation execution time overruns a predetermined limit (for example the average execution time) increase the voltage-frequency used by the processing resource in order to complete the operation within the hard execution time deadline.

Because each operation will not run to its worst case execution cycle count every time, but instead is more likely to run to the average execution cycle count or time, then the voltage-frequency of the processing resource performing the operation can be initially kept lower than normal in the expectation that even at this level the operation is likely to be completed before the operation deadline. Then if the operation is still being performed past a predetermined time, perhaps close to the deadline, then the voltage-frequency can be increased significantly in order to quickly finish the operation in order to meet the deadline. In the worst case cycle count, the power consumed will be the same as it would have been had the operation been performed at a constant higher (albeit for a shorter time) voltage-frequency level. In cases where the operation is performed during or substantially during the initial low voltage-frequency level, then less power is consumed than if this operation had been performed using a constant higher voltage-frequency level. Therefore, overall less power will be consumed by this apparatus which will improve battery life for portable devices such as mobile wireless communications or computing terminals.

In particular in this aspect the present invention provides a controller for a processing apparatus having a plurality of processing resources, at least some of said resources having controllable supply voltage and/or frequency; the controller comprising: means for scheduling operations on said resources, at least some of said operations having a predetermined deadline by which the operation must be performed; means for determining a voltage and/or frequency profile for a said operation having a said deadline; means for instructing the resources to perform said operations according to said schedule and said profile.

Preferably the profile is arranged to minimise the average power consumed by the apparatus in performing the operation.

Preferably the profile is a voltage-frequency profile.

Preferably the voltage-frequency profile has more than two voltage or frequency operating points.

Preferably the voltage-frequency profile includes voltage or frequency operating points which increase over the execution time of the operation.

Preferably the voltage-frequency profile increases the voltage or frequency operating points if the operation has not been completed within the average cycle count of the operation.

Preferably the determining means comprises an operation control data-structure comprising a number of records each corresponding to a predetermined operation, each record comprising the worst case cycle count of the corresponding operation.

Preferably each record comprises the average cycle count and the standard deviation of the average cycle count of the operation.

Preferably each record comprises a voltage and/or frequency profile.

Preferably the determining means comprises a voltage-frequency profile calculator arranged to calculate a said voltage-frequency profile for a said operation based on the worst case cycle count of the operation, the average cycle count of the operation, and the standard deviation of the average count.

Preferably the determining means further comprises a quantising means arranged to quantise the voltage-frequency profile determined by the calculator to correspond to available voltage and/or frequency operating points of the resources.

Preferably the scheduling means comprises a process timetable having a number of control messages for the resources, the messages corresponding to the operations and containing voltage and/or frequency control instructions.

There is also provided a processing apparatus having a plurality of processing resources, at least some of said resources having controllable supply voltage and/or frequency, the apparatus comprising a controller as defined above. Preferably the apparatus comprises a wireless terminal or base station.

In particular in another aspect there is provided a method of controlling a processing apparatus having a plurality of processing resources, at least some of said resources having controllable supply voltage and/or frequency; the method comprising: scheduling operations on said resources, at least some of said operations having a predetermined deadline by which the operation must be performed; determining a voltage-frequency profile for a said operation having a said deadline; instructing the resources to perform said operations according to said schedule and said profile.

Preferably the profile is arranged to minimise the average power consumed by the apparatus in performing the operation.

Preferably the profile is a voltage-frequency profile.

Preferably the voltage-frequency profile has more than two voltage or frequency operating points.

Preferably the voltage-frequency profile includes voltage or frequency operating points which increase over the execution time of the operation.

Preferably the voltage-frequency profile increases the voltage or frequency operating points if the operation has not been completed within the average cycle count of the operation.

Preferably said determining comprises generating an operation control data-structure comprising a number of records each corresponding to a predetermined operation, each record comprising the worst case cycle count of the corresponding operation.

Preferably each record comprises the average cycle count and the standard deviation of the average cycle count of the operation.

Preferably each record comprises a voltage and/or frequency profile.

Preferably the determining comprises a calculating a said voltage-frequency profile for a said operation based on the worst case cycle count of the operation, the average cycle count of the operation, and the standard deviation of the average count.

Preferably the determining further comprises quantising the voltage-frequency profile determined by the calculation to correspond to available voltage and/or frequency operating points of the resources.

Preferably the scheduling comprises generating a process timetable having a number of control messages for the resources, the messages corresponding to the operations and containing voltage and/or frequency control instructions.

Preferably the processing apparatus is a wireless terminal or base station.

There is also provided a computer program or a program product carrying code readable by a processor in order to carry out any of the above methods.

BRIEF DESCRIPTION OF THE DRAWINGS

Embodiments of the present invention are described with respect to the following drawings, by way of example only and without intending to be limiting, in which.

Figure 15:
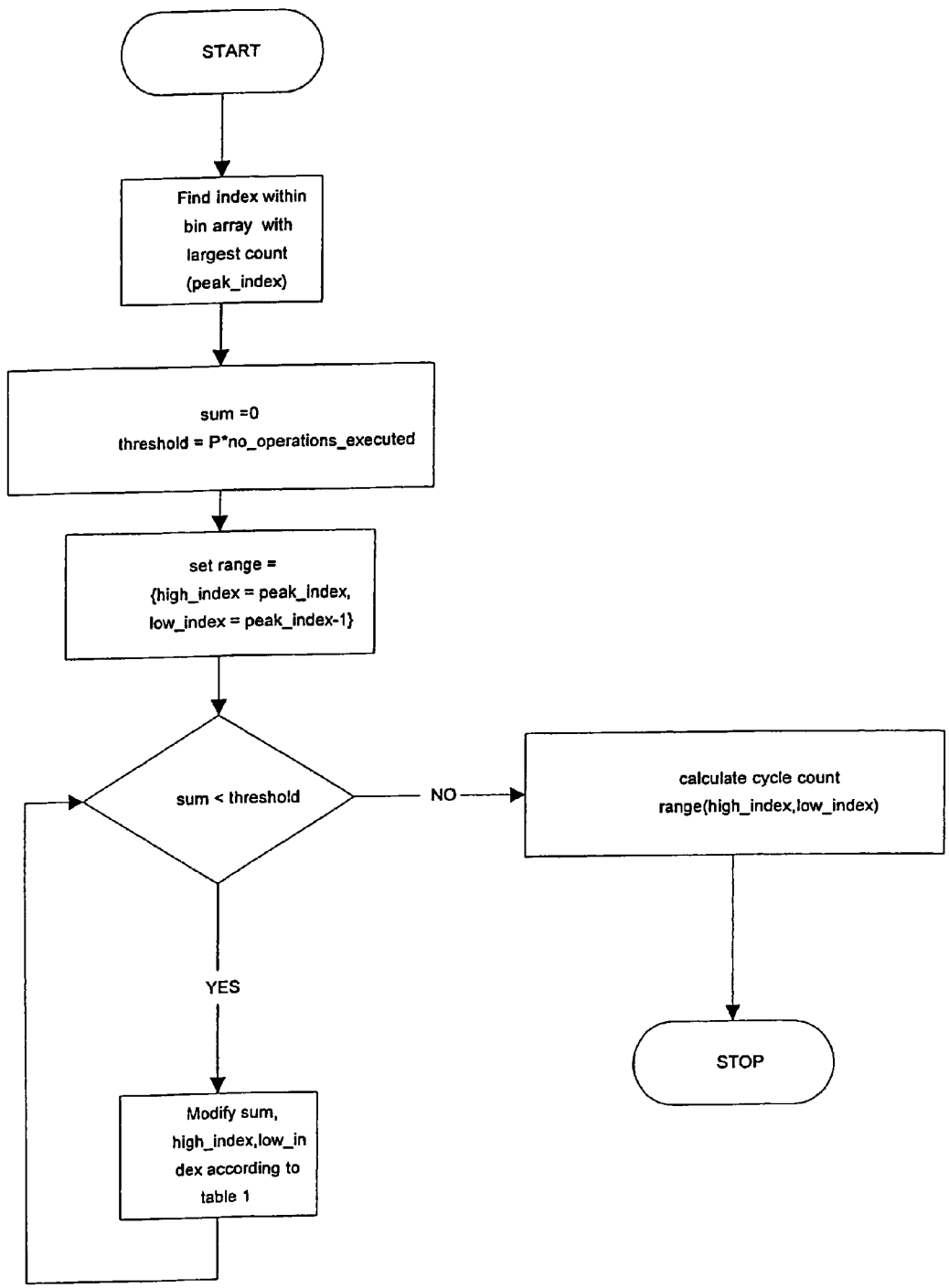
FIG. 15 illustrates a method of determining metrics characterising the simplified probability density distribution of FIG. 9.

Table 1 shows a number of calculations for determining the cycle period of a number of phases; and Table 2 shows the functions to be performed in the embodiment corresponding to the flow chart of FIG. 15.

DETAILED DESCRIPTION OR PREFERRED EMBODIMENTS

Figure 1:
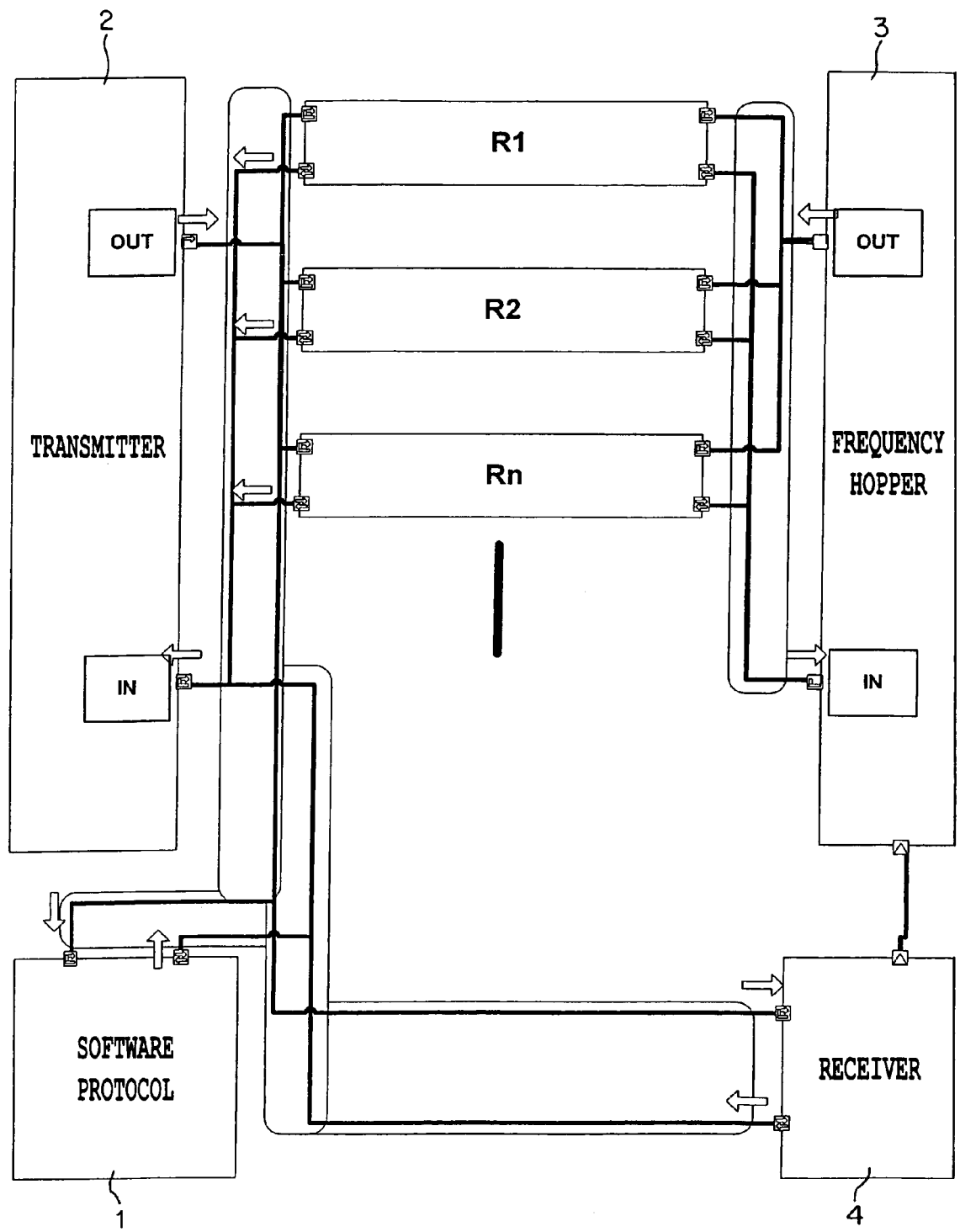
FIG. 1 is a schematic of an architecture for a processing apparatus.

Referring to FIG. 1, the architecture of a processing apparatus according to an embodiment comprises a plurality of processing resources R1-Rn, a controller 1, a control plane 2, a data plane 3 and a data-bus controller 4. The processing apparatus might be used in a wireless communications terminal for receiving and sending signals to a base station according to one or more protocols such as UMTS and GSM for example. The apparatus is particularly suited to software defined radio (SDR) applications, and for convenience and ease of explanation the embodiment will be described with respect to mobile wireless communications applications, although it is not so limited.

The processing resources R could be ASIC's for specific wireless communications processing such as a Viterbi decoder for example, they could also be reconfigurable digital signal processing (DSP) blocks with multiple uses, or similarly reconfigurable field programmable gate arrays (FPGA's)

The data plane 3 is a logical entity comprising a data-bus coupled to a memory resource and input/output interfaces to other resources, for example analogue-to-digital converters, digital-to-analogue converters, channel decoder, equaliser and vocoder. The memory is used to store sampled signal symbols as well as those symbols and associated data following various stages in the processing chain to obtain decoded traffic data.

The data-bus controller 4 controls access between the various resources R and the memory and other data plane components; allowing for example a resource to read appropriate data and then write data back to the memory following processing by the resource.

The control plane 2 is another logical entity comprising a control-bus between the resources R and the controller 1. Both the data and control planes could also be implemented as a cross-bar or network for example.

The controller 1 controls operation of the data plane 3 via the data-bus controller 4 in order to ensure that the data in the data plane passed to the right resource R for processing and that demands for data transfer by competing entities are handled appropriately. The fabric used to transfer data might also be capable of being switched to run at different v-f depending on the configuration of the system. Like all other resources the data plane would be configured by the controller, via the 'data bus controller/arbiter'. Those skilled in the art will be familiar with the operation of data bus controllers.

In general terms, the controller, ensures that data in the data plane is properly processed by the various resources R, in the right order and if possible in parallel by splitting operations into tasks or groups of tasks that can be performed using different resources. Additionally, the controller 1 controls the voltage-frequency (v-f) of each resource R in such a way that the required processing is carried out with a minimum of power consumption. Many of the processing tasks will have predetermined deadlines by which processing must be finished and so the controller 1 is arranged to control the processing in the apparatus according to this constraint whilst at the same time minimising power consumption. This is advantageous in portable terminals having processing tasks with hard deadlines such as wireless communications terminals for example.

Figure 2:
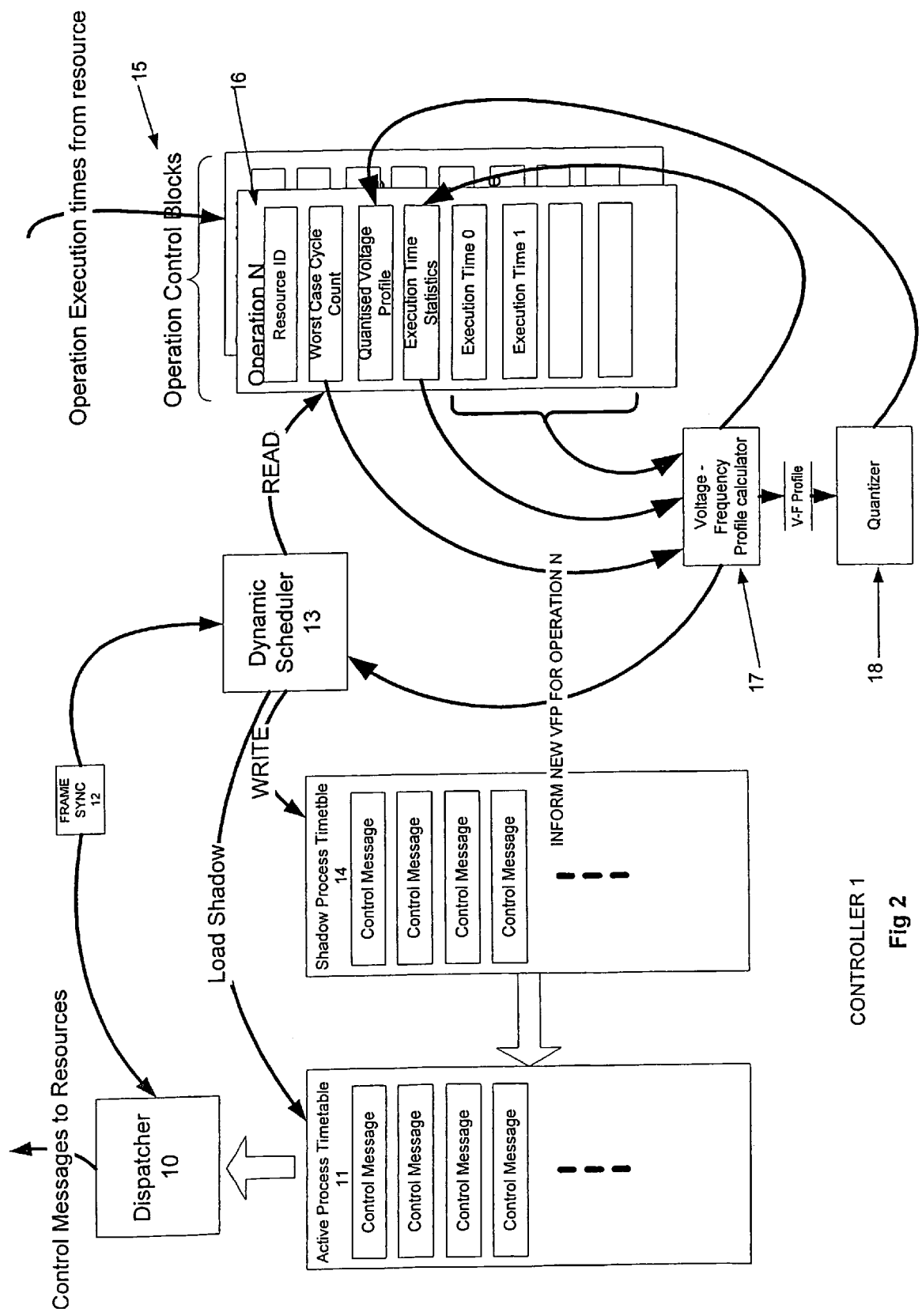
FIG. 2 is a schematic of a controller for the processing apparatus of FIG. 1.
Figure 3:
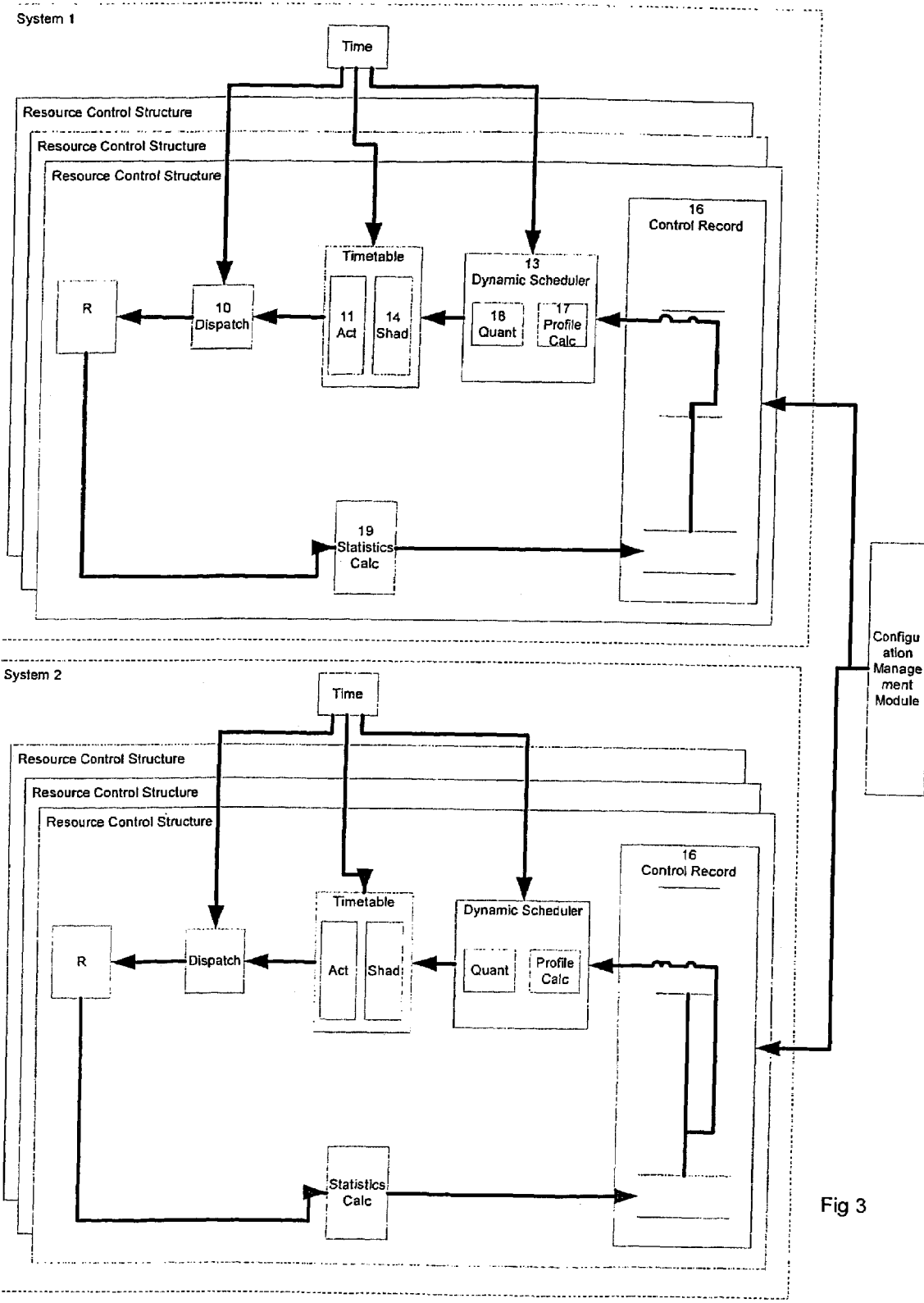
FIG. 3 is a schematic showing the control structure of the controller for each resource controlled by the controller of FIG. 2.

FIG. 2 shows the controller 1 schematically, and FIG. 3 shows the control structures embodied by the controller 1 for each resource; including two sets of resources R using different time bases, for example GSM and UMTS. The controller 1 comprises a dispatcher 10 which controls forwarding of control messages to the appropriate resource R. The dispatcher 10 determines what control messages to send to what resource R at what time according to a process timetable 11. The process timetable 11 is a data-structure which comprises a list of control messages each having an associated resource identifier and a start time. The start time is usually relative to a predetermined time reference such as a 10 ms radio frame in the case of WCDMA. Wireless communications signals are transmitted within frames to which a receiver synchronises itself in order to properly receive and process the signals. A frame sync source 12 derived from an internal clock signal for example is supplied to the dispatcher 10 to ensure that the processing operations are properly synchronised as between each other.

Each control message will contain a transmission time, destination, a command, voltage-frequency setting and configuration information. The nature and timing of the control messages in the process timetable 11 is determined by a dynamic scheduler 13. The scheduler 13 writes or updates control messages in a shadow process timetable 14 which is another data-structure having the same structure as the active process timetable 11. The active process timetable 11 is typically loaded with the contents of the shadow process timetable 14 at some convenient time, for example at the end/start of a frame. A shadow timetable is used because changes to the timetable would take a finite amount of time to write into the table and while this is happening the timetable would have incomplete data and so may result in faulty commands being sent to the resources. The controller updates the control messages for various operations as events change. For example an operation may finish early freeing up one of the resources earlier than expected and the controller may therefore re-assign a later scheduled operation to the newly freed up processing resource R.

Figure 4:
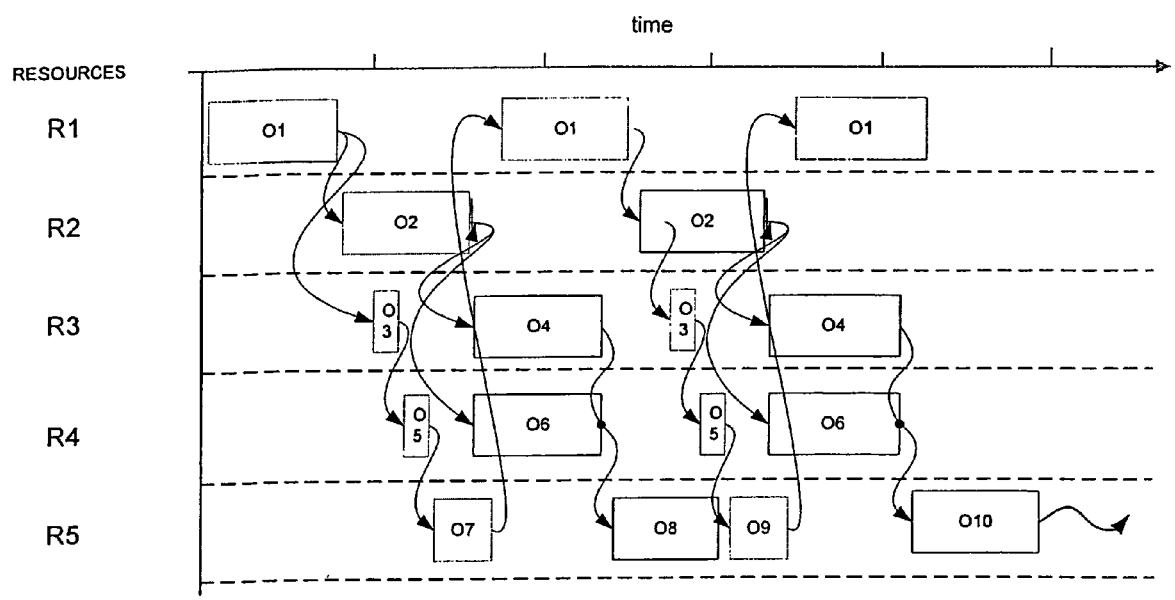
FIG. 4 is a scheduling schematic showing the timing of various operations performed on a number of parallel processing resources.

FIG. 4 shows a schedule for operations O1-O10 which are distributed over time and over 5 processing resources R1-R5. Some of the operations require data from a previous operation and so can't be started until after that operation has been completed, whereas other operations can run in parallel. Schedulers for scheduling operations over a number of processing resources are known in the art. Typically schedulers will schedule operations based on their worst case cycle count, that is the number of processing cycles that the processing resource will have to perform in the worst case situation in order to complete the operation. From this it can be determined what the maximum execution time of an operation is and this is then used to schedule the operation in with the other required operations. However often operations will not require their worst case cycle count and instead will finish early. Dynamic schedulers can dynamically change the schedule to take account of the fact that operations sometimes finish early, and perhaps start a later scheduled operation early. Such dynamic schedulers are also known in the art.

The controller 1 also comprises an operations control block data-structure 15 which comprises a control block or record 16 for each operation the processing apparatus is to carry out. The record 16 of each operation comprises a number of parameters associated with the operation including its worst case cycle count, a resource identifier (R1-Rn), a voltage frequency (v-f) profile, and preferably execution time statistics corresponding to previous executions of the operation in the processing apparatus. These include past execution times, (execution time Ø, executing time 1 . . . ), that can be used to implement filtering of the values before statistics are calculated.

The controller also comprises a voltage frequency profile calculator 17 which determines the v-f over the worst case execution time of the operation, and is used to control the v-f operating parameters of the resource R performing the operation. A quantiser 18 adjusts the output of the v-f profile calculator 17 to one of the achievable or practical v-f points associated with the resource R. The quantiser and profile calculation can be done in a single block e.g. when only 2 voltage settings are being used. The quantised v-f profile for the processing resource R associated with the operation is then written to that operation's control block or record 16.

Figure 5A:
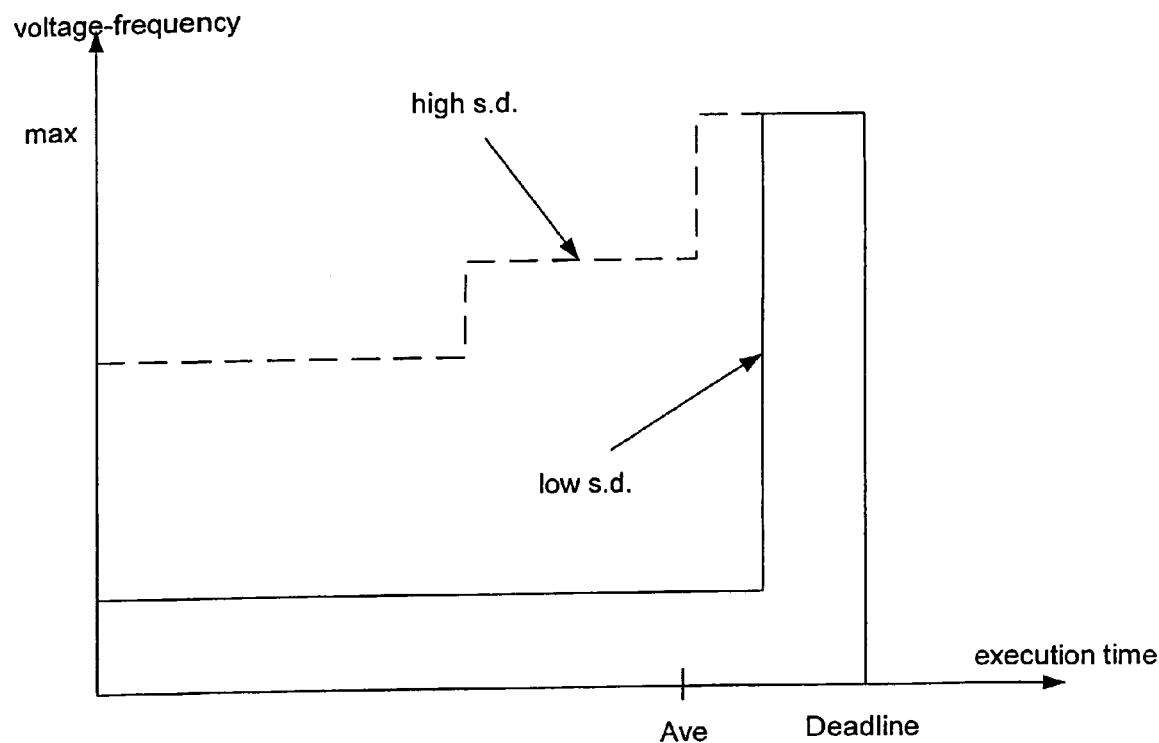
FIGS. 5a and 5b show voltage-frequency profiles for an operation.

The v-f profile for each operation will typically start off at a certain level and then, if necessary increase this level as the operation's hard deadline is approached, as shown in FIG. 5a. This takes advantage of the fact that on many occasions the operation will not require its worst case cycle count and will therefore finish early. By keeping the v-f low at first, many executions of the operation will be performed using this low v-f only, and therefore on average power consumption associated with this operation will be reduced. In the instances where the operation requires its worst case cycle count, or a cycle count approaching this, then the v-f is increased in order to ensure the operation is finished by its deadline.

Figure 5B:
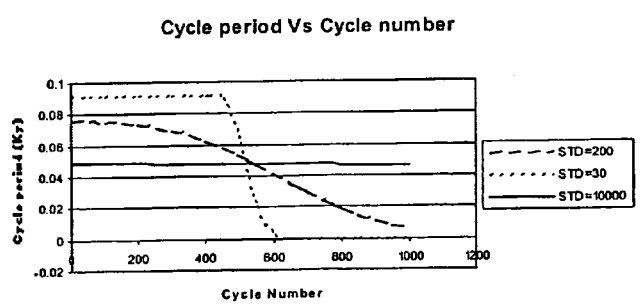

The v-f profile for each operation is influenced by the historical execution statistics for that operation. For example if the operation has an average execution time or cycle count that has a low standard deviation, in other words there is not much variation, then the initial v-f level can be set low such that the average execution time will be reached at this low v-f near the hard deadline. The v-f level can then be raised significantly in order to ensure the operation finishes before its hard deadline for those executions when the operation requires more than its average number of cycle counts. For operations having a high standard deviation, that is there is a lot of variation in the execution times, then the v-f level will initially be higher in order to ensure that the operation finishes before its hard deadline for all execution situations. FIG. 5b shows the cycle period vs. cycle number for three standard deviation values, for an average execution cycle count of 500 and a standard deviation that varies between 30 and 10000. Ultimately the calculation is based on cycle count but a conversion can be made from execution time to cycle count and similarly a conversion could also be made with higher level metrics such as average and deviation of the number of iterations of a turbo decoder which could be mapped to the equivalent cycle count statistics.

The dynamic scheduler 13 can be arranged to retrieve the v-f profiles from the appropriate operation's control block 16 for each operation or task it writes to the process timetables 11 and 14 as indicated in FIG. 2. Alternatively the dynamic scheduler 13, may retrieve parameters such as the operation's worst count, average count, deadline and from these derive a voltage frequency profile as indicated in FIG. 3.

The operations will be scheduled as before referring to FIG. 4, that is the operation execution time will be the same, however additional v-f controls will be added to the process timetable in order that the resource R performing the operation will operate according to the v-f profile during execution of the operation. Thus the overall execution time of the operation is unaffected, however its v-f levels will vary according to the determined v-f profile.

Each of the resources R has its own supply voltage and clock frequency, and the controller sets the voltage-frequency for each module. Because each module R can operate off a separate clock the interface to the data plane will be asynchronous, and in addition it must also buffer the different operating voltages.

The resources R are usually specialized data processing blocks with limited control code, that is they receive data, process it and then pass it on. The controller 1 determines how and when each resource operates. All data transfer between resources goes via the data plane. All control messages and measurement reports go via the control plane. The data plane is also regarded as a resource and so its characteristics can also be controlled via the data bus controller. For example its v-f may be adjusted when interacting with a particular resource R.

Each resource executes an operation when instructed to do so by the controller 1. Within the control processor the dispatcher reads the Process Timetable and sends messages to each resource just before the resource is expected to process data. The message will contain configuration information and a command word. In this way the resources can be statically scheduled to implement the required functionality.

One of the commands that can be sent to a resource is a voltage-frequency command. This command will set the supply voltage to the resource and also the operating frequency. The resource comprises a counter to count the actual number of cycles. Alternatively the resource may contain a timer, operating off a standard clock. This is used to time how long the operation takes to complete i.e. the actual execution time. On completion the resource will send, in a message, the execution time and operation handle to the controller. The cycle operation time will vary due to the voltage-frequency ramping itself but also because the operation may take a different number of cycles to complete. The reasons for changes in cycle count include: the processing required is dependant on the data for example a voice decoder; the resource shares a data bus with another resource so may be blocked while the second resource uses the bus; the system may dynamically modify the processing implemented by the resource as a result of a change in an external condition for example, the number of iterations of Turbo decoder may change as a result of a change in the channel conditions. The controller 1 calculates the actual cycle count from the actual execution time using its knowledge of what the voltage-frequency ramp was. An alternative to measuring the execution time is to use a counter in the resource to count the number of cycles directly.

The controller 1 stores execution times/cycle counts sent by each resource, at the end of each operation, in the respective operation control block data record 16. The operation control block 15 is initialized with the worst-case cycle count and start time relative to frame period i.e. earliest time operation can start because of availability of data from other operations; and its relative timing deadline when an operation is created. If the statistics of this operation are known at design time the average cycle count and standard deviation may also be set at initialisation. In this case a flag is set to indicate that the actual execution times are not required and in addition the voltage-frequency profile needs only be calculated when the relative timing deadline changes. The controller 1 includes a statistics calculator 19 to update statistics such as the average cycle count and standard deviation for each operations control block record 16.

When either the static resource schedule changes or the voltage-frequency profile for any operation changes the messages in the process time table 11 and 14 are updated with the correct value for the voltage-frequency. To avoid an excessive amount of time spent calculating new voltage-frequency profiles it is likely that this will only be done at relatively infrequent intervals, for example the end of a frame.

By increasing the voltage-frequency during the execution of an operation the power consumption is reduced if the operation takes less than its average cycle count but still achieves its deadline if the worst case cycle count is encountered. This makes it ideally suited to hard realtime applications such as wireless terminals especially if they are designed to be reconfigurable—Software Defined Radio.

Figure 6:
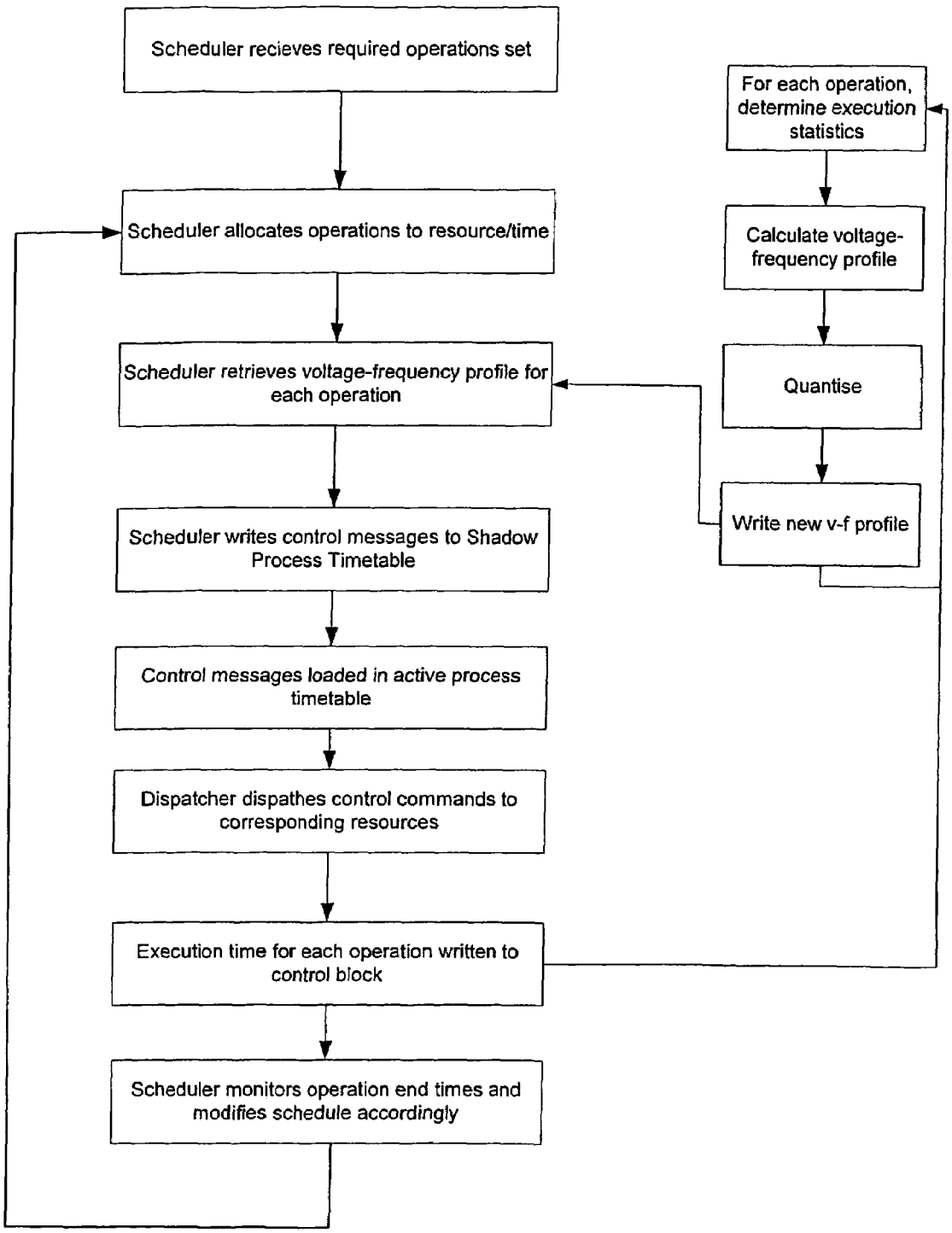
FIG. 6 shows a flow chart of operation of the controller of FIG. 2.

Referring to FIG. 6, a flow chart of the operation of the controller 1 is shown. The dynamic scheduler 13 receives a definition of the data flow between operations which includes a set of required operations and their timing constraints from a Configuration Management Module. For example in a SDR terminal, this may correspond to receiving cellular calls in GSM. The operations required to achieve the reception and transmission of the GSM signals are then downloaded to the scheduler 13. The scheduler 13 determines an initial schedule by splitting the operations up and allocating them to different processing resources R at appropriate times as illustrated in FIG. 4. The scheduler 13 then reads the v-f profile data for each operation from the appropriate operation control blocks 16, and writes appropriate control messages to the shadow process timetable 14. At an appropriate point (in absolute time) these are loaded into the active process timetable 11 and forwarded by the dispatcher 10 to the appropriate resource R.

Following completion of an operation by a resource R, a completion message is sent to the controller 1 and includes the execution time and/or execution cycle count for the operation. This information is forwarded to the appropriate control block 16 where it is added to the statistical information stored on the operation. The scheduler 13 also monitors the operation end times and may dynamically reschedule later operations if the completed operation finished early.

The v-f profile for each operation is calculated from the statistical execution time data stored in the operation blocks 16, and is quantised to practical v-f points for the resource R and then stored in the operations block 16 for that operation (or delivered directly to the dynamic scheduler). The v-f profile is updated periodically as the statistical data mounts.

The process timetable is preferably updated as follows:
 a. Find all messages requesting an operation.
 b. Purge all stale voltage-frequency commands associated with this operation from the list
 c. Add new voltage-frequency commands to the list using new voltage-frequency settings.

Alternatively, some resources may be able to self modify their voltage-frequency setting internally. So in such a scenario the configuration message sent to a resource will contain a set of voltage-frequency values and their associated relative timings. So when these values are changed only the configuration command needs to be modified.

A further enhancement to this scheme uses more than one process timetable 11 (and associated shadow 14), as is illustrated in FIG. 3(system 1 and 2). Each timetable runs from a different timebase and frame sync. This can be used when two systems such as GSM and UMTS are being implemented on the same platform. In such a system the two frame sync time periods are different and operate out of phase with each other, and without multiple timetables the common denominator would be very high and hence the timetable would be very long. This can be further extended to each operation on a resource or each resource with multiple operations has its own timetable, v-f profile, calculator, etc. This simplifies access to the timetable. The overlapping of resources (e.g. data bus) between two systems (GSM and UMTS) is possible but scheduling becomes difficult because of the different timebases i.e. the scheduling would have to run across a common multiple making it very big.

In alternative arrangements only one of voltage or frequency may be adjusted such that a separate voltage profile or frequency profile is calculated for the operations to be performed. For example the frequency might be set so the operation completes at a specific time and this might simplify the scheduler and reduce resource requirements e.g. output data will only be written into global memory at the end of an operation and then be immediately read by another operation hence freeing up RAM.

In a further embodiment, a more sophisticated method of determining a frequency and voltage profile for an operation is provided. In a practical communications system the cycle count for an operation can be difficult to model using standard distributions such as a Guassian distribution. This means it is not always easy to represent or characterise such a cycle count distribution with simple metrics such as the mean or standard deviation. Non-standard models may be necessary because there are many unpredictable factors which determine the actual cycle count distribution.

The cycle count is a function of the configuration of the complete system as, well as the data it is processing and external parameters such as the channel environment. In a reconfigurable system an operation, such as a turbo decoder, has to use shared resources (e.g. a common data bus) to complete its operation. Because the configuration cannot be anticipated, the number of other users of the shared resource cannot be pre-determined and therefore the delay, in gaining the resource is non-deterministic and hence the operations cycle count cannot be accurately predicted. More complicated operations (e.g. vocoders) have internal branch instructions which execute different functions depending on the actual data received and hence will execute a variable number of cycles before completion and will also access shared resources in an unpredictable manner, this in turn will effect the cycle count for other resources.

Additionally, many operations such as a turbo decoder or MIMO space-time code can be increased or decreased in complexity depending on the type of channel environment (e.g. the number of Turbo iterations or the number of antenna's in a MIMO system). This change in complexity will obviously affect the cycle count for that block and also the pattern or profile of shared resource accesses. Such variables make the cycle count difficult to model, and hence the determination of a suitable voltage profile very complicated.

Flavius Gruian "Hard Real-Time Scheduling for Low-Energy Using Stochastic Data and DVS processors", ISLPED'01, Aug. 2-7, 2001, describes a method of determining a voltage profile for tasks having variable cycle counts but with hard deadlines. The profile provides the voltage level to operate a variable voltage processing resource at the current cycle count in carrying out a particular task such as decoding a wireless signal. The profile is determined from historical information about the number of cycle counts required to carry out the same task a number of different times. The aim of operating the resource according to the voltage profile is to minimise power consumption by the resource, on average, in performing the task.

Figure 7:
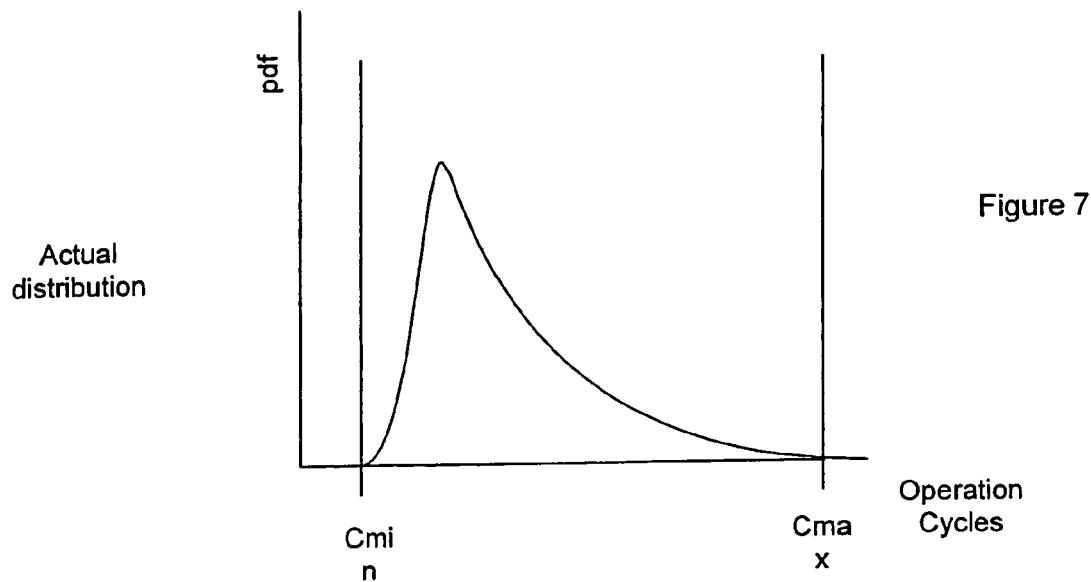
FIG. 7 is an actual distribution of probability density versus cycle count for the processing of a particular task by a processing resource.

FIG. 7 shows a cycle count distribution for a task, also known as the probability density function (PDF) for that task. On rare occasions the task will take a minimum Cmin or maximum Cmax number of cycles, however most of the time the task will be completed within a number of cycles between these two extremes. The actual distribution will depend on the particular task, and may well change over time, for example as channel conditions in a wireless communications system change. In the example shown it can be seen that most of the time the task will be completed in less than half the maximum number of cycles. It can also be seen that this distribution is non-standard.

From Gruian, the voltage profile which minimises overall power consumption whilst ensuring that a hard deadline will always be met (even in the case of Cmax) can be calculated from:

$$k_y = \frac{A \cdot \left(\sqrt{1 - cdf_y}\right)}{\sum_{0 < y \leq WX} \sqrt{1 - cdf_y}}$$

where Ky is the cycle period for cycle y, A is the timing deadline, and CDFy is the cumulative distribution function (from integrating the PDF) for y, ie the probability that the operation will finish before cycle y.

Figure 8:
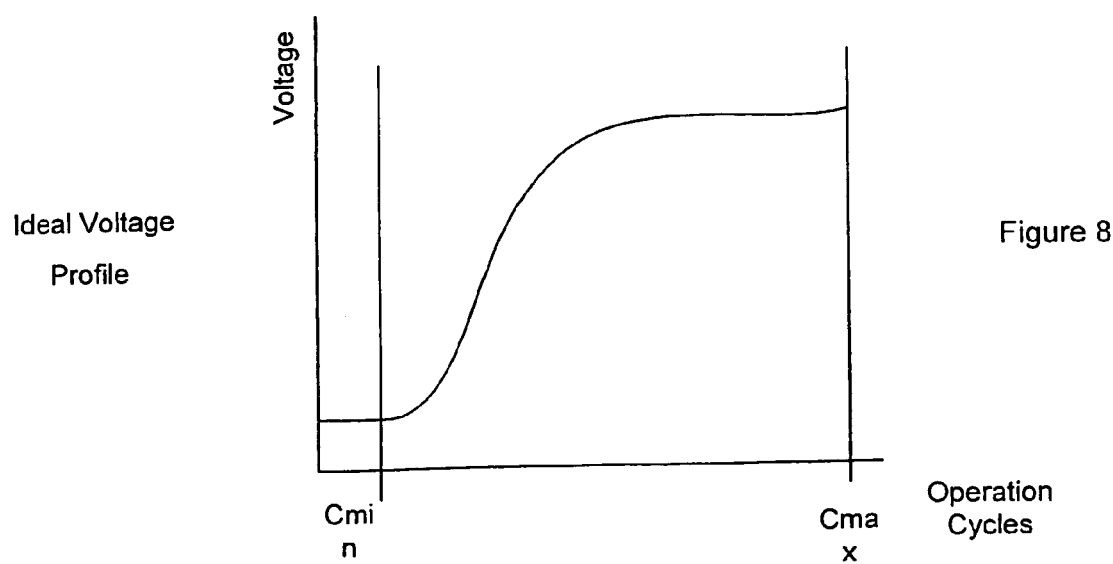
FIG. 8 is an ideal voltage profile of a DVS processing resource for a task based on the probability density of cycle counts on previous iterations of the task as shown in FIG. 7.

Thus for each cycle y the ideal cycle period $k_y$ can be calculated, which in turn provides the ideal operating frequency $f_y$ for each cycle y. The ideal operating voltage $v_y$ can then be determined for each cycle y, to provide an ideal voltage profile as shown in FIG. 8. The relationship between operating frequency and operating voltage is dependent on the hardware used.

Each cycle period value $k_y$ is a maximum value, and a smaller clock period will still achieve the required timing deadline but will be less power efficient because the operating voltage will have to be increased. Ideally we want to maximise the clock period because this means we can reduce the supply voltage on the circuit and hence reduce power consumption. The relationship between the minimum supply voltage and the clock period is a function of the silicon technology but can be estimated using the following formula:

$$T_{clk} \propto \frac{CV_{DD}}{(V_{DD} - V_{TH})^\alpha}$$

Where $V_{DD}$ is the supply voltage and $V_{th}$, $\alpha$ and C are technology constraints. See—A. P. Chandrakasan, R. W. Broderson, Minimizing Power Consumption in Digital CMOS Circuits, Proc of IEEE, VOL. 83, NO. 4, April 1995.

In practise once the clock period has been calculated the supply voltage can either be calculated mathematically or by using a look up table, provided by the manufacturer for example. By using a look up table we limit the precise operating voltage to a range of voltages. In a practical system this is important because there will be limits on the maximum and minimum operating voltage. In addition it may also be necessary to quantise the voltage to a set of voltages that the circuit has been verified against.

To ensure that the operating voltage can always support the clock frequency the voltage should be quantized to a higher value.

A difficulty with the above ideal frequency (and voltage) profile using Gruian is that this equation is difficult to implement in practical systems particularly given the requirement for square root calculations for each cycle count. It can also be seen that the voltage would need to be continuously modified over the performance of the task, which is also difficult to implement; requiring extensive calculations.

Figure 10:
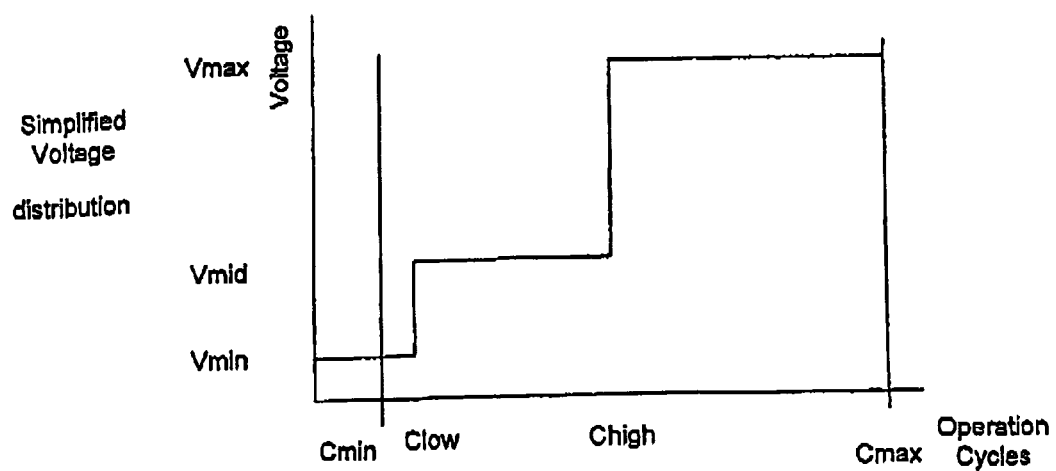
FIG. 10 shows a simplified voltage profile corresponding to the distribution of FIG. 9.

A simpler implementation is provided by "quantising" the voltage profile to a fixed number of voltage levels or phases, as shown in FIG. 10 which uses three levels—Vmax, Vmid, and Vmin. It can be seen that if the task is completed in near the minimum number of cycles then only the lowest voltage level Vmin is required. Then up to a certain cycle count the task is continued at an intermediate voltage level Vmid. Finally, if the task is still not finished, the processing resource is then run at a maximum voltage level Vmax to ensure that the operation is finished by the hard deadline—indicated by Cmax.

A quantised voltage profile is far simpler to implement in a practical system, and preferably the fewer voltage levels used the better. This is because in practice a step change in voltage and frequency cannot occur simultaneously and so the voltage has to step up before the frequency. This period is inefficient and so the number of voltage steps (transitions) should be reduced.

Figure 9:
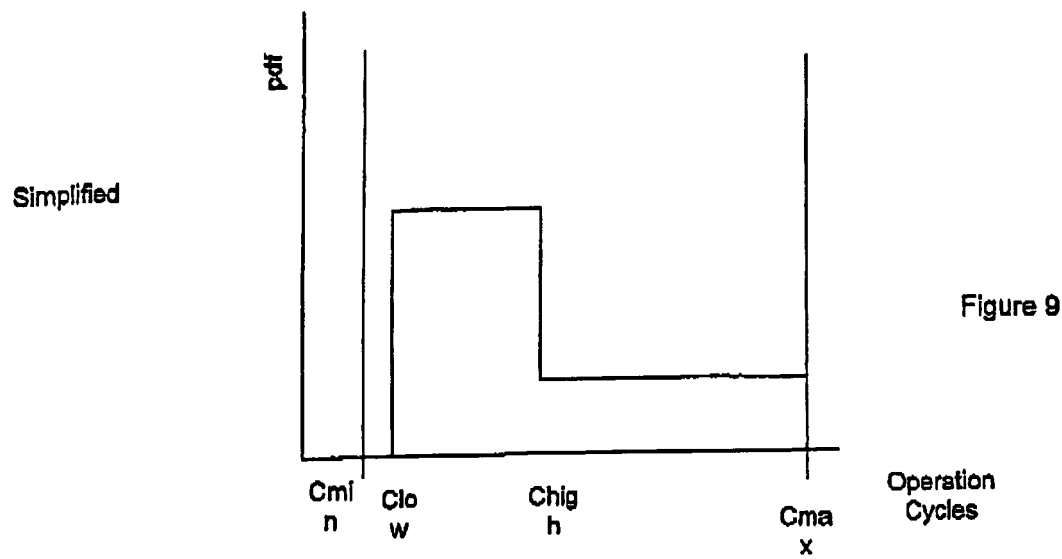
FIG. 9 shows a simplified probability density distribution of FIG. 7.

The quantised voltage profile of FIG. 10 is achieved by utilising a simplified or quantised model of cycle count distribution (PDF) as shown in FIG. 9. By using certain PDF metrics to characterise the simplified PDF, the voltage profile calculations can be significantly simplified.

In this embodiment these metrics are a range or two bounds Clow and Chigh within or between which a fraction P of all cycle counts can be found. More generally, a number of ranges or bounds $C_0$-$C_n$ may be needed to sufficiently accurately characterise a particular distribution. Each range of cycle counts will then have a fraction P0-Pn-1, of all cycle counts. Returning to the simplified distribution of FIG. 9, the actual value of P will vary depending on the distribution shape, however good results have been achieved with a P of between 90 and 95%. In order to further simplify the calculations, the transitions between the voltage levels Vmin to Vmid, and Vmid to Vmax correspond to the cycle count bounds Clow and Chigh respectively. The voltage levels are derived from the cycle periods or frequencies of each section of the profile, for example using the formula described above. These cycle periods Tmax, Tmid, Tmin can be derived from simplified equations based on the equation for $k_y$ above as follows:

$$t_{max} = \frac{t_D}{\left[C_{low} + (C_{high} - C_{low})\frac{2}{3}\left(\frac{1-(1-P)^{3/2}}{P}\right) + \frac{2}{3}(C_{max} - C_{high})(1-P)^{3/2}\right]}$$

$$t_{min} = t_{max}\frac{2}{3}(1-P)^{1/2}$$

$$t_{mid} = \frac{2}{3}t_{max}\left(\frac{1-(1-P)^{3/2}}{P}\right)$$

where $t_{max}$ is the clock period for the lowest voltage (Vmin), $t_{mid}$ is the clock period for the intermediate voltage (Vmid), and $t_{min}$ is the clock period for the highest voltage (Vmax).

After the clock periods have been calculated, the absolute times for each voltage transition {T1,T2} are then calculated. T1 and T2 correspond to the time intervals after an operation has started when the supply voltage is switched to Vmid and Vmax respectively.

$T1 = Clow * Tmax$ $T2 = Clow * Tmax + Tavg * (Chigh - Clow)$

Because these formulae give no limit on how small the cycle period can go, Tmax may need to be limited to a value defined by the technology. When this value is limited the proceeding cycle periods must be decreased to compensate (i.e. this ensures that if the worst case cycle count is encountered the operation will still complete on time). A scaling factor (K) is used to modify tmid and tmax and is defined as:

$$K = t_d - \frac{t_{MIN\_CLK\_PERIOD}(C_{max} - C_{high})}{T_2}$$

where Td is the deadline for operation to complete by, $T_{MIN\_CLK\_PERIOD}$ is the minimum clock period set by the technology or hardware, and $T_2$ is the offset from the start of the operation when the voltage switches from Vmid to Vhigh.

After the modified cycle periods have been calculated they are converted in to supply voltages (i.e. the minimum operating voltage which will support the cycle period). The voltages and cycle periods may have to be further quantised to meet the physical constraints on the system. For example the system may only have a limited number of voltage-frequency values it can be set to. In such a case the voltage-frequency values should be rounded up to ensure the operation deadline is met.

Whilst the calculation has been simplified by using the same transition times as the Clow and Chigh values, more generally a quantised voltage profile having N phases can also be determined using different transition times or counts as shown by the following mathematical treatment:

Gruian gives the relationship between the required clock period and cdf:

$$k_y = \frac{A \cdot \left(\sqrt{1 - cdf_y}\right)}{\sum_{0 < y \leq WX} \sqrt{1 - cdf_y}} \quad [1]$$

where $k_y$ is the cycle period for cycle y; A is the timing deadline; $cdf_y$ is the cumulative probability distribution function for cycle y i.e. the probability the function will complete using less than y cycles (this can be derived by integrating PDF or other methods described further below); and WX is the Worst Case number of cycles taken by function to complete.

It can be seen that the maximum cycle period will be at the lowest cycle number (y=1, $cdf_1$=0) and is a function of the cdf:

$$k_{max} = \frac{A}{\int_{y=0}^{y=WX} \sqrt{1 - cdf(y)} \, dy} \quad [2]$$

Figure 11:
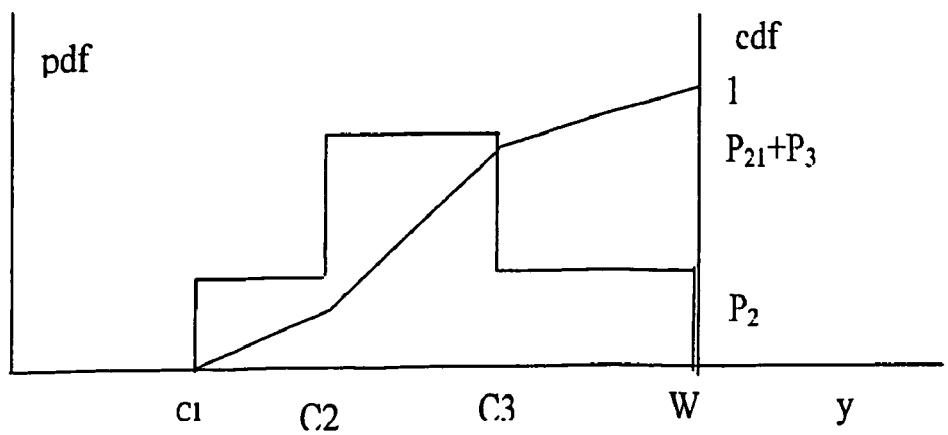
FIG. 11 shows an N phase pdf profile with superimposed and corresponding cdf profile.

If the cdf is depicted as a piecewise linear function as shown in FIG. 11, k can be separated in to a number of integrations depending on how many voltage steps are used:

$$T_{max} = \quad [3]$$

$$k_{max} = \frac{A}{\int_{y=0}^{y=C_1} \sqrt{1 - cdf(y)} \, dy + \int_{y=C_1}^{y=C_2} \sqrt{1 - cdf(y)} \, dy + \int_{y=C_2}^{y=C_3} \sqrt{1 - cdf(y)} \, dy + \ldots + \int_{y=C_N}^{y=WX} \sqrt{1 - cdf(y)} \, dy}$$

Each phase or section (C1-C2, C2-C3, C3-W) corresponds to a range of cycle counts and for each phase the circuit has an optimum operating voltage/clock frequency/clock period. In an ideal system the clock period will gradually increase but as this not feasible in a practical system, and so a fixed clock period for each phase is determined instead. To derive this fixed time period ($T_{fixed}$) the time taken to execute the ideal voltage profile for a specified phase is calculated. This time is then divided by the number of cycles executed in the phase to give an upper limit for $T_{fixed}$ as shown by:

$$T_{FIXED} \cdot (C_c - C_b) \le \int_{C_b}^{C_c} k(y) dy = \quad [4]$$

$$\int_{C_b}^{C_c} \frac{A \cdot (\sqrt{1-cdf(y)})}{\sum_{0<y\le WX} \sqrt{1-cdf(y)}} dy = T_{\max} \int_{C_b}^{C_c} \sqrt{1-cdf(y)}\, dy$$

$$\int (1-cdf(y))^{\frac{1}{2}} dy = \int_{y=C_b}^{C_c} \left(1 - P_{ab} - P_{cb}\left(\frac{y-C_b}{C_c-C_b}\right)\right)^{\frac{1}{2}} dy = \quad [5]$$

$$\int (L+Ky)^{\frac{1}{2}} dy = \frac{2}{3}\frac{1}{K}\left[(L+Ky)^{\frac{3}{2}}\right]_{C_a}^{C_b}$$

This is part of the Tmax equation (eqn 3) and is the evaluation of the integration between Cc and Cb where the pdf has a constant value Pab between Ca and Cb and Pcb between Cc and Cb. L and K are derived from this integral identity, and are defined as follows:

$$L = 1 - P_{ab} + \frac{P_{cb}C_b}{(C_c - C_b)},\ K = \frac{-P_{cb}}{C_c - C_b} \quad [6]$$

Substituting, we obtain:

$$\int (1-cdf(y))^{\frac{1}{2}} dy = \frac{2}{3}\frac{(C_c - C_b)}{P_{cb}}\left[(1-P_{ab})^{\frac{3}{2}} - \left[(1-(P_{cb}+P_{ab}))^{\frac{3}{2}}\right]\right] \quad [7]$$

Figure 12:
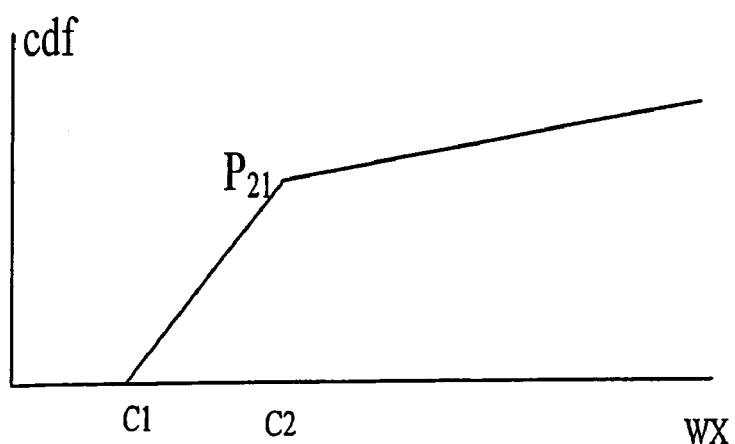
FIG. 12 shows a 3 phase cdf profile.

Substituting this back into the above equation for $T_{max}$ [3], for a 3 phase voltage profile as shown in FIG. 12:

$$T_{\max} = \frac{A}{C_1 + \frac{2}{3}\left(\frac{C_2 - C_1}{P_{21}}\right)\left(1 - (1-P_{21})^{\frac{3}{2}}\right) + \frac{2}{3}(WX - C_2)(1-P_{21})^{\frac{1}{2}}} \quad [8]$$

Figure 13:
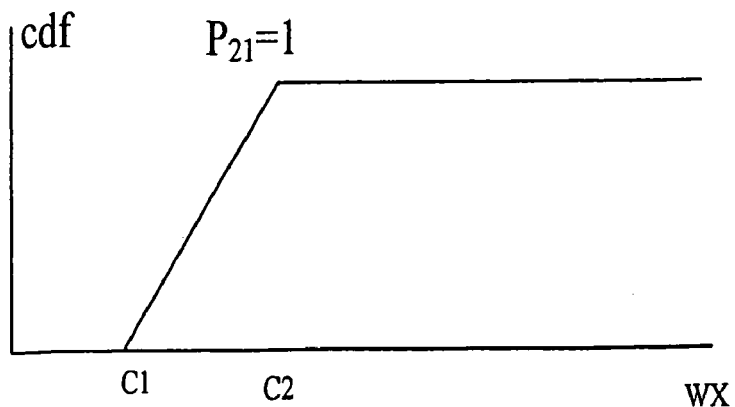
FIG. 13 shows a 2 phase cdf profile.

For a two phase profile as shown in FIG. 13:

$$T_{\max} = \frac{A}{C_1 + \frac{2}{3}(WX - C_1)} = \frac{3A}{C_1 + 2WX} \quad [9]$$

$T_{fixed}$ for each phase can then be determined using the above equation [4]. A summary of the calculations required to implement a number of different phases is shown in Table 1.

Once $T_{fixed}$ for each phase is determined, the start of each phase can then be determined. The start of each phase is defined by a cycle count value. i.e. the number of clock cycles a functional block has stepped through. The operating voltage of the functional block needs to be changed at the start of each phase. If the command to instruct the functional block to change voltage is done centrally the timing of the voltage command ($t_i$) must be calculated. The timing is calculated using the known cycle period ($T^i_{fixed}$) for phase i and the number of cycles during this phase ($C_{i+1}-C_i$) is:

$$t_i = \sum_{j=0}^{j=i-1} T^j_{fixed}(C_{j+1} - C_j) \quad [10]$$

As discussed above, a special situation occurs when the required clock period cannot be achieved within the available voltage range. i.e. The maximum operating voltage corresponds to a larger clock period. In this case the operating voltage for that phase is set to the maximum voltage and then the clock periods for the previous phases have to be decreased to compensate. The scaling factor (K) can be derived from the following equation:

$$t_{n+1} \ge \sum_{i=0}^{i=n}(C_{i+1} - C_i)T^i_{\text{fixed\_v}} \le \sum_{i=0}^{i=n}(C_{i+1} - C_{i-1})T^i_{\text{fixed}} \quad [11]$$

In other words, the time taken to execute the phase I (Ci->Ci+1) for a mapped voltage has to be smaller than or equal to the ideal voltage.

Where $T^i_{fixed\_v}$ is the cycle period after mapping to voltage v.

and $T^i_{fixed}$ is the ideal cycle period before voltage quantisation.

$$t_{n+1} = K\sum_{i=0}^{i=n-1}(C_{i+1} - C_i)T^i_{fixed} + T^n_{\text{fixed\_v}}(C_{n+1} - C_n) \quad [12]$$

This equation is derived from eqn 10 and 11 by substituting Tfixed_v for phase n and then the previous phases have to be scaled by a factor K to compensate. K should be calculated after fixing the voltage for phase n it then should be recalculated after fixing the voltage for phase n-1 etc down to phase 1. However in practice, this may only be done for the last phase.

Solving for K:

$$K = \frac{t_{n+1} - T^n_{\text{fixed\_v}}(C_{n+1} - C_n)}{\sum_{i=0}^{i=n-1}(C_{i+1} - C_i)T^i_{fixed}} = \frac{t_{n+1} - T^n_{\text{fixed\_v}}(C_{n+1} - C_n)}{t_n} \quad [13]$$

As outlined above the voltage profile is calculated using the cdf describing the distribution of cycle counts. There are a number of ways to derive the cdf:

If the function is well characterised or very simple the cdf will be known at design time. In this scenario the voltage profile can also be calculated at design time. Or the cycle count values calculated at design time and the voltage profile is calculated at run time; for example using the above operating voltage equation.

In some cases the type of distribution may be known, for example a Normal distribution, but where the parameters such as the mean and standard deviation are not known at design time. In this case the parameters can be calculated at run time using either past history for the cycle count or could be based on a given configuration having a pre-defined set of parameters. Once the parameters have been calculated they can be used with a look up table for the type of distribution to calculate the required cycle count values. An embodiment for implementing this case is described further below.

Figure 14:
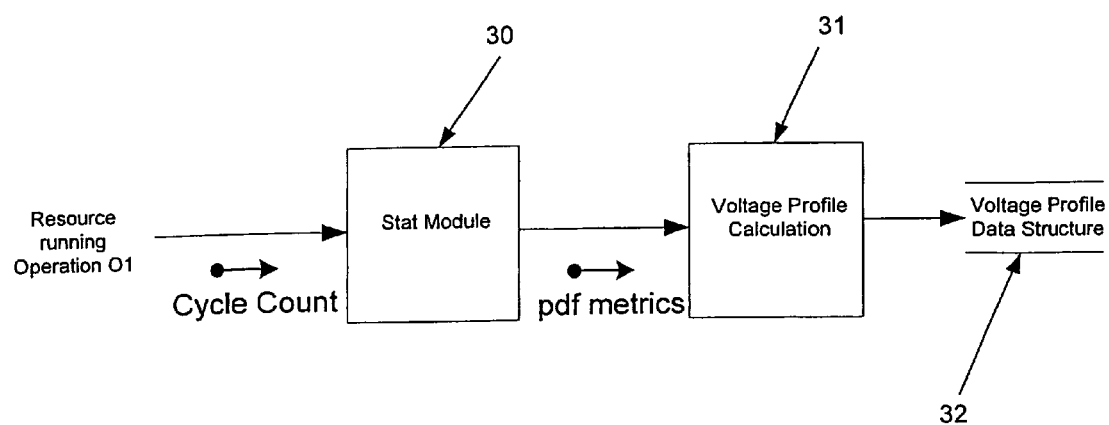
FIG. 14 shows an architecture for a voltage profile calculator according to an embodiment.

If the distribution is unknown it has to be calculated by looking at the past history of cycle counts. In the embodiment described below, this is done by incrementing a counter associated with a range of cycle counts (i.e. a bin) then the function uses the number of cycles in this bin. The number of bins and size of bins can vary. The bin size does not have to be uniform. As the bins are filled a number of techniques can be used to determine the cycle count values used by the voltage profile calculation. One example is given in the embodiment below.

Where the distribution is calculated dynamically at run time the start state (i.e. the state before the function has started executing) has to be defined. This start state can be based on a best guess of the distribution or can just be the most general case, for example the pdf is flat between 0 and WX An embodiment is described in FIGS. 14 and 15 for the practical implementation of a voltage profile calculator for the case where the distribution type is unknown. FIG. 14 illustrates an architecture for a voltage profile calculator which receives cycle counts each time a particular task has been completed. The calculator comprises a statistics module 30 analogous to the statistics calculator 19 of FIG. 3. This receives and stores (in a control record 16 of FIG. 2 or 3 for example) the cycle count each time an operation is performed. From this historical information it provides metrics (Clow, Chigh, P) from which a voltage calculation block 31 can determine the cycle periods Tmax, Tmid, Tmin of the sections of the profile. From this the corresponding voltage levels Vmax, Vmid, Vmin of these three sections is calculated together with the switching times T1 and T2 between these levels. This information is then stored in a voltage profile data structure 32 (which may correspond to the control record of FIGS. 2 and 3) for use in controlling the voltage of a processing resource the next time the operation is to be performed by that resource. This may be implemented using the process timetable control messages mechanism of the first embodiment as described with respect to FIG. 2, although other mechanisms could alternatively be used.

An array of memory locations or bins are allocated as counters, each bin corresponding to a range of cycle counts. All bins are cleared to zero when a new configuration is implemented. When a cycle count is received from an operation or task the value in the associated bin is incremented. As more operations are executed a better profile of the cycle count is created. The range associated with each bin can be different in size but more commonly they are equal as this simplifies implementation.

Given this profile a set of metrics are calculated which characterise the PDF. This calculation can be done following each new cycle count or after N new cycle counts or at some predetermined time interval. A number of metric types can be calculated (e.g. mean and standard deviation when a normal distribution) but in this implementation a range of cycle counts {Clow,Chigh} is calculated which contains the fraction (P) of all cycle counts received (no_of_operations_executed).

Clow and Chigh are preferably calculated by first finding the bin with the highest value (peak) and then looking at bins either side of this one until a range of bins can be found which encompasses P*no_of_operations_executed. The details of this algorithm are shown in FIG. 15 and Table 2.

These metrics characterise a simplified PDF such as that shown in FIG. 9. This is derived from the actual Probability Density Function (PDF), for example one similar to that shown in FIG. 7. These metrics allow for a much simpler calculation of the voltage profile. This in turn is easier to implement. In the example of FIGS. 9 and 10, the simplified PDF and voltage profile are partitioned into 3 phases or sections, but a more complicated method could use many phases as already outlined.

The preferred formulae for calculating the clock periods and from that the supply voltages for the three phases have been given above. From these formulae it is possible to calculate 3 clock periods (tmax,tmid,tmin) corresponding to the following phases of the operation {C<Clow, Chigh>C>Clow, C>Chigh}. After the clock periods have been calculated, the absolute times for each voltage transition {T1,T2} are then calculated as described above.

The formulas given have no limit on how small the cycle period can go, however Tmin is limited to a value defined by the technology. If Tmin is limited, then the proceeding cycle periods must be decreased to compensate. This ensures that if the worst case cycle count is encountered the operation will still complete on time. The scaling factor (K) described above is used to modify tmid and tmax. More generally, the scaling applies to all phases. The phase with the maximum voltage (minimum cycle period) is tested first, so that all earlier phases are potentially scaled. Then the phase with the next highest voltage after scaling is tested and if necessary earlier phases further scaled. This can then be repeated for all phases.

After the modified cycle periods have been calculated they are converted in to supply voltages which are the minimum operating voltage which will support the cycle period. The supply voltage, cycle period and transition times (T1,T2) are stored in a data structure (for example a modified control block record) for use when the operation is next executed.

The voltages may additionally need to be quantised to meet the physical constraints on the system. The system may only have a limited number of voltage-frequency values it can be set to. In such a case the voltage-frequency values should be rounded up to ensure the operation deadline is met.

Figure 16:
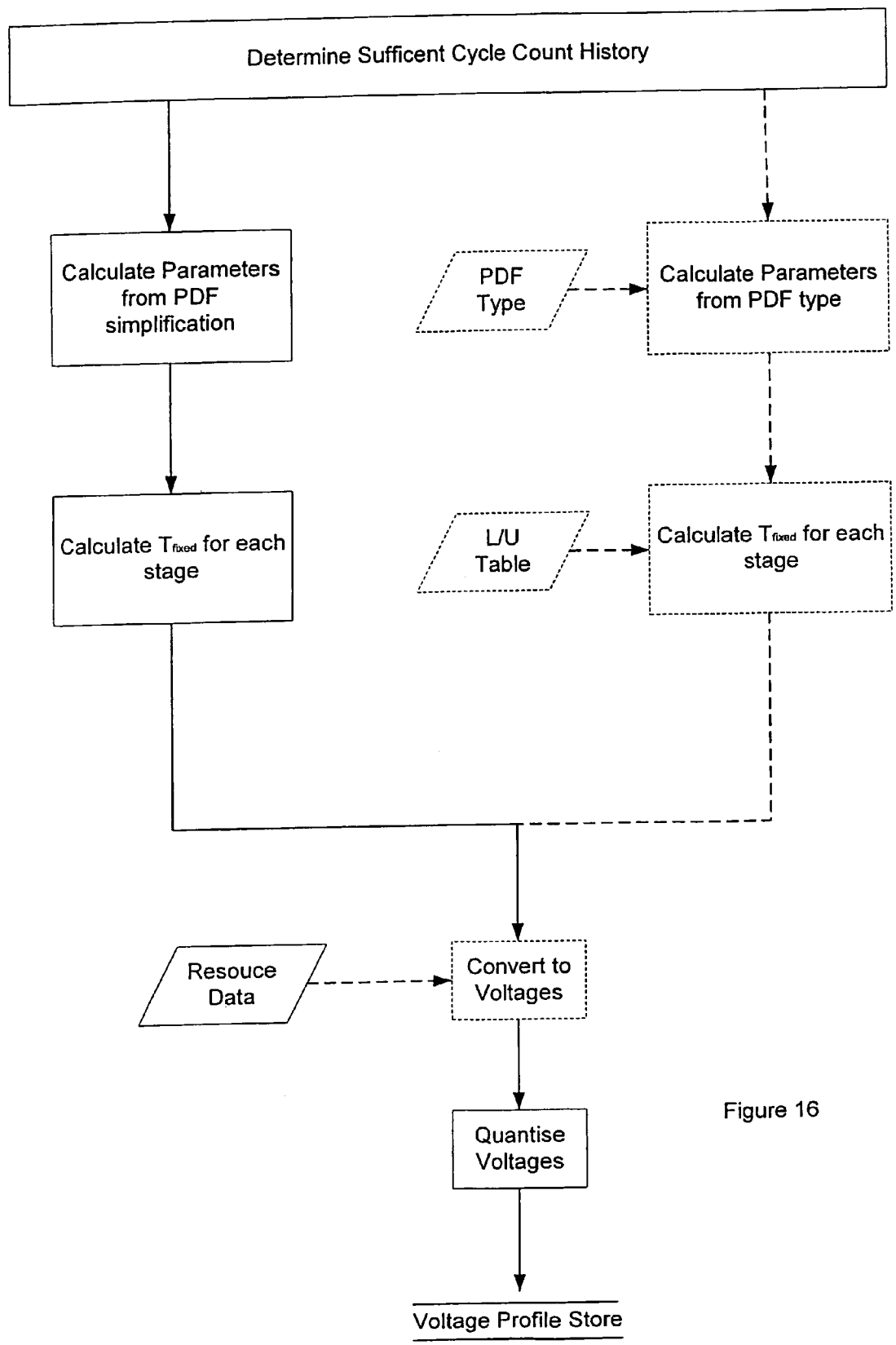
FIG. 16 illustrates a method of determining a voltage profile.

These processes are summarised in the operation flow chart of FIG. 16. The cycle count history is determined, for example by the bin method of FIG. 15, or alternatively by a pre-stored cycle count history, perhaps provided by a manufacturer. Referring only to the solid line parts of FIG. 16, parameters which characterise the distribution (PDF) of the cycle count history by a number of linear functions are determined. This corresponds for example to the distribution shown in FIG. 9, and will include the various cycle bounds $C_{low}$, $C_{mid}$ and $C_{max}$ for example. In addition the CDF function can be determined by integrating the PDF function, for example by integrating or accumulating the cycle count bins within the required range.

Once these parameters characterising the (simplified) PDF are determined, the cycle count period Tfixed for each phase or section of the simplified PDF is determined as described above. Any scaling required is also carried out, as is any quantising (not shown). The timing of the phase or step changes is also determined.

The periods or frequencies for each phase are then converted to voltage levels as described above, and if necessary these are quantised.

The quantised voltages (and frequencies) are then stored in a profile to be used for controlling a resource, for example by writing a control instruction to the resource with the appropriate voltage and frequency operating point. However this could be implemented in other ways available to those skilled in the art.

One possible application for this embodiment is in a set of DSP's with their own voltage control and each executing one or more operations or tasks. The statistics module 30 and voltage profile calculation block 31 are located in a general-purpose processor (control processor) optimised for implementing control code. The control processor then sends commands to each DSP setting its operating voltage and frequency.

Another application is in a set of simple processing elements in a reconfigurable array. The operating voltage and frequency of each element is then set by the control processor.

An embodiment is described with respect to FIG. 16 for implementing a voltage profile calculator in the case where the type of distribution is known, but the parameters defining the particular distribution are not. As with the unknown distribution type case, historical cycle count data are determined. Then, referring only to the dashed lines parts of FIG. 16, known parameters (indicated by the distribution type) such as the mean and standard deviation are calculated from this statistical data. These are then used to calculate the cycle period $T_{fixed}$ for a number of phases. This could be implemented using the previous equations but the cycle count range for a given probability is calculated by using the distribution type and the dynamically calculated parameters. The distribution equation can be calculated by using a look up table or by directly solving the equation.

Then as with the unknown distribution type case, these cycle periods are converted into operating voltages for use in controlling a resource as previously described.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analog array or similar device in order to configure analog hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

TABLE 1

| Phase | cycle count: y | pdf(y) | Cdf(y) | $\int \sqrt{1-\text{cdf}(y)}\, dy$ (Note 1) | Cycle Period (Note 2) $T_{FIXED}$ | Comments |
|---|---|---|---|---|---|---|
| 0 | $0 < y < WX$ | $1/WX$ | $y/WX$ | $2WX/3$ | $A/WX$ | 1 phase voltage profile $T_{max} = 3A/2WX$ Only the worst case cycle count is know |
| 0 | $0 < y < C_1$ | 0 | 0 | $C_1$ | $T_{max}$ | 2 phase voltage profile |
| 1 | $C_1 < y < Wx$ | $1/(WX - C_1)$ | $(y - C_1)/(WX - C_1)$ | $\frac{2}{3}(WX - C_1)$ | $2T_{max}/3$ | $T_{max} = \dfrac{3A}{2WX - C_1}$ |
| 0 | $0 < y < C_1$ | 0 | 0 | $C_1$ | $T_{max}$ | Lowest and worst case cycle counts known 3 phase voltage profile |
| 1 | $C_1 < y < C_2$ | $P_{21}/(C_2 - C_1)$ | $P_{21} \cdot (y - C_1)/(C_2 - C_1)$ | $\frac{2}{3}\left(\dfrac{C_2 - C_1}{P_{21}}\right)\left(1 - (1 - P_{21})^{\frac{3}{2}}\right)$ | $\frac{2}{3}\left(\dfrac{T_{max}}{P_{21}}\right)\left(1 - (1 - P_{21})^{\frac{3}{2}}\right)$ | $T_{max} = \dfrac{A}{C_1 + \frac{2}{3}\left(\dfrac{C_2 - C_1}{P_{21}}\right)\left(1 - (1 - P_{21})^{\frac{3}{2}}\right) + \frac{2}{3}(WX - C_2)(1 - P_{21})^{\frac{1}{2}}}$ |
| 2 | $C_2 < y < WX$ | $(1 - P_{21})/(WX - C_2)$ | $P_{21} + (1 - P_{21}) \cdot (y - C_2)/(WX - C_2)$ | $\frac{2}{3}(WX - C_2)(1 - P_{21})^{\frac{1}{2}}$ | $\frac{2}{3}T_{max}(1 - P_{21})^{\frac{1}{2}}$ | |
| N | $C_b < y < C_c$ | $P_{cb}/(C_c - C_b)$ | $\dfrac{2}{3}\dfrac{(C_c - C_b)}{P_{cb}}\left[(1 - P_{ab})^{\frac{3}{2}} - [1 - (P_{cb} + P_{ab})]^{\frac{3}{2}}\right]$ | $\dfrac{2}{3}\dfrac{(C_c - C_b)}{P_{cb}}\left[(1 - P_{ab})^{\frac{3}{2}} - [1 - (P_{cb} + P_{ab})]^{\frac{3}{2}}\right]$ | $\left[\frac{2}{3}\dfrac{T_{max}}{P_{cb}}(1 + P_{ab}P_{ab})^{\frac{3}{2}}\right] - \left[(1 - (P_{cb} + P_{ab}))^{\frac{3}{2}}\right]$ | n phase voltage profile |

TABLE 2

| high_index > high_limit | low_index < low_limit | bin[high_index] > bin[low_index] | bin[high_index] == bin[low_index] | bin[high_index] < bin[low_index] |
|---|---|---|---|---|
| NO | NO | sum = sum + bin[high_index]<br>high_index = high_index + 1 | sum = sum + bin[high_index] + bin[low_index]<br>high_index = high_index + 1<br>low_index = low_index − 1 | sum = sum + bin[low_index]<br>low_index = low_index − 1 |
| NO | YES | sum = sum + bin[high_index]<br>high_index = high_index + 1 | sum = sum + bin[high_index]<br>high_index = high_index + 1 | sum = sum + bin[high_index]<br>high_index = high_index + 1 |
| YES | YES | DO NOTHING | DO NOTHING | DO NOTHING |
| YES | NO | sum = sum + bin[low_index]<br>low_index = low_index − 1 | sum = sum + bin[low_index]<br>low_index = low_index − 1 | sum = sum + bin[low_index]<br>low_index = low_index − 1 |

The invention claimed is:

1. A voltage-frequency profile calculator for determining a voltage and/or frequency profile for a processing resource within a time a predetermined single task is executed, the calculator comprising:
   means for determining a number of metrics characterizing a probability distribution of cycle counts for completing said task using said resource, the metrics determining means comprising means for determining the type of said distribution and corresponding metric types, and means for calculating said metrics from said cycle counts distribution based on the distribution type; and
   means for determining a voltage or frequency profile for a next said task dependent on said metrics;
   wherein the determined voltage or frequency profile comprises two or more phases each having a different voltage or frequency function over its duration.

2. A calculator according to claim 1 wherein one or more of the voltage or frequency functions is a linear function providing a fixed voltage or frequency.

3. A calculator according to claim 1 wherein the distribution is a Gaussian distribution and the metrics are the mean and standard deviation.

4. A calculator according to claim 1 wherein the metrics determining means comprises means for characterising a simplified distribution corresponding to said cycle count distribution and determining said metrics from said simplified distribution.

5. A calculator according to claim 1 wherein said distribution metrics determining means comprises means for recording the cycle counts required to complete said task by said resource on previous occasions.

6. A calculator according to claim 1 wherein said distribution metrics determining means comprises means for receiving predetermined metrics.

7. A calculator according to claim 1 wherein the voltage profile determining means comprises means for calculating a cycle period for each said phase.

8. A calculator according to claim 1 wherein the profile has three phases and the cycle period calculations are determined according to:

$$t_{max} = \frac{t_D}{\left[C_{low} + (C_{high} - C_{low})\frac{2}{3}\left(\frac{1-(1-P)^{\frac{3}{2}}}{P}\right) + \frac{2}{3}(C_{max} - C_{high})(1-P)^{\frac{3}{2}}\right]}$$

$$t_{min} = t_{max}\frac{2}{3}(1-P)^{\frac{1}{2}}$$

$$t_{mid} = \frac{2}{3}t_{max}\left(\frac{1-(1-P)^{\frac{3}{2}}}{P}\right).$$

9. A controller for a processing apparatus having a plurality of processing resources, at least some of said resources having controllable supply voltage and/or frequency; the controller comprising:
   means for scheduling operations on said resources, at least some of said operations having a predetermined deadline by which the operation must be performed;
   means for calculating a voltage or frequency profile according to claim 1;
   means for instructing the resources to perform said operations according to said schedule and said profile.

10. A calculator according to claim 4 wherein the simplified distribution is a series of linear functions extending over the maximum duration of the task.

11. A calculator according to claim 7 wherein the cycle period calculating means utilises the following equation for determining the maximum cycle period:

$$T_{max} = k_{max} = \frac{A}{\int_{y=0}^{y=C_1}\sqrt{1-cdf(y)}\,dy + \int_{y=C_1}^{y=C_2}\sqrt{1-cdf(y)}\,dy + \int_{y=C_2}^{y=C_3}\sqrt{1-cdf(y)}\,dy + \ldots + \int_{y=C_N}^{y=WX}\sqrt{1-cdf(y)}\,dy}$$

wherein $$\int(1-cdf(y))^{\frac{1}{2}}dy = \int_{y=C_b}^{C_a}\left(1 - P_{ab} - P_{cb}\left(\frac{y-C_b}{C_c-C_b}\right)\right)^{\frac{1}{2}}dy =$$

$$\int(L+Ky)^{\frac{1}{2}}dy = \frac{2}{3}\frac{1}{K}\left[(L+Ky)^{\frac{3}{2}}\right]_{C_a}^{C_b}.$$

12. A calculator according to claim 7 wherein the voltage profile determining means comprises means for scaling the cycle period if the un-scaled cycle period is not supported by the resource.

13. A calculator according to claim 7 wherein the voltage profile determining means comprises means for determining the time to change from one cycle period phase to another.

14. A calculator according to claim 7 wherein the voltage profile determining means comprises means for converting the cycle period for each said phase into a voltage level for each said phase.

15. A calculator according to claim 10 wherein the metrics are the bounds of probabilities of each linear function.

16. A calculator according to claim 11 wherein the cycle period calculating means
utilises the following equation for determining the other cycle periods:

$$T_{FIXED} \cdot (C_c - C_b) \le \int_{C_b}^{C_a} k(y) dy =$$

$$\int_{C_b}^{C_c} \frac{A \cdot (\sqrt{1 - cdf(y)})}{\sum_{0 < y \le WX} \sqrt{1 - cdf(y)}} dy = T_{\max} \int_{C_b}^{C_c} \sqrt{1 - cdf(y)} \, dy.$$

17. A calculator according to claim 12 wherein the means for scaling the cycle period utilises the following equation:

$$K = \frac{A - T_{\text{fixed\_v}}^n (C_{n+1} - C_n)}{\sum_{i=0}^{i=n-1} (C_{i+1} - C_i) T_{\text{fixed}}^i} = \frac{A - T_{\text{fixed\_v}}^n (C_{n+1} - C_n)}{t_{n-1}}.$$

18. A calculator according to claim 13 wherein the means for determining the time to change from one cycle period phase to another utilises the following equation:

$$t_i = \sum_{j=0}^{j=i-1} T_{\text{fixed}}^j (C_{j+1} - C_j).$$

19. A calculator according to claim 15 wherein the metrics comprise a lower bound and an upper bound defining a predetermined percentage of the cycle counts in the distribution.

20. A calculator according to claim 18 wherein the means for converting the cycle period for each said phase into a voltage level for each said phase utilises the following equation:

$$T_{clk} \propto \frac{CV_{DD}}{(V_{DD} - V_{TH})^\alpha}.$$

21. A method of generating a voltage and/or frequency profile indicating a determined voltage and/or frequency profile for a processing resource within a time a predetermined single task is executed, comprising:
  determining a number of metrics characterizing a probability distribution of cycle counts for completing said task using said resource, said determining comprising determining the type of said distribution and corresponding metric types, and calculating said metrics from said cycle counts distribution based on the distribution type;
  determining a voltage or frequency profile for a next said task dependent on said metrics; and
  outputting a signal indication of the determined voltage or frequency profile, wherein the determined voltage or frequency profile comprises two or more phases each having a different voltage or frequency function over its duration.

22. A method according to claim 21 wherein one or more of the voltage or frequency functions is a linear function providing a fixed voltage or frequency.

23. A method according to claim 21 wherein the distribution is a Gaussian distribution and the metrics are the mean and standard deviation.

24. A method according to claim 21 wherein the metrics determining means comprises means for characterising a simplified distribution corresponding to said cycle count distribution and determining said metrics from said simplified distribution.

25. A method according to claim 21 wherein said distribution metrics determining comprises recording the cycle counts required to complete said task by said resource on previous occasions.

26. A method according to claim 21 wherein said distribution metrics determining comprises receiving predetermined metrics.

27. A method according to claim 21 wherein the voltage profile determining comprises calculating a cycle period for each said phase.

28. A method according to claim 21 wherein the profile has three phases and the cycle period calculations are determined according to:

$$t_{\max} = \frac{t_D}{\left[ C_{low} + (C_{high} - C_{low}) \frac{2}{3} \left( \frac{1 - (1-P)^{\frac{3}{2}}}{P} \right) + \frac{2}{3} (C_{\max} - C_{high})(1-P)^{\frac{3}{2}} \right]}$$

$$t_{\min} = t_{\max} \frac{2}{3} (1-P)^{\frac{1}{2}}$$

$$t_{mid} = \frac{2}{3} t_{\max} \left( \frac{1 - (1-P)^{\frac{3}{2}}}{P} \right).$$

29. A method of controlling a processing apparatus having a plurality of processing resources, at least some of said resources having controllable supply voltage and/or frequency; the method comprising:
  scheduling operations on said resources, at least some of said operations having a predetermined deadline by which the operation must be performed;
  calculating a voltage or frequency profile according to claim 21;
  instructing the resources to perform said operations according to said schedule and said profile.

30. A carrier medium carrying processor code for implementing a method according to claim 21.

31. A method according to claim 24 wherein the simplified distribution is a series of linear functions extending over the maximum duration of the task.

32. A method according to claim 27 wherein the cycle period calculating utilises the following equation for determining the maximum cycle period:

$$T_{\max} = k_{\max} = \frac{A}{\int_{y=0}^{y=C_1} \sqrt{1 - cdf(y)} \, dy + \int_{y=C_1}^{y=C_2} \sqrt{1 - cdf(y)} \, dy + \int_{y=C_2}^{y=C_3} \sqrt{1 - cdf(y)} \, dy + \ldots + \int_{y=C_N}^{y=WX} \sqrt{1 - cdf(y)} \, dy}$$

wherein $$\int (1-cdf(y))^{\frac{1}{2}} dy = \int_{y=C_b}^{C_a} \left(1 - P_{ab} - P_{cb}\left(\frac{y-C_b}{C_c-C_b}\right)\right)^{\frac{1}{2}} dy =$$

$$\int (L+Ky)^{\frac{1}{2}} dy = \frac{2}{3}\frac{1}{K}\left[(L+Ky)^{\frac{3}{2}}\right]_{C_a}^{C_b}.$$

33. A method according to claim 27 wherein the voltage profile determining comprises scaling the cycle period if the un-scaled cycle period is not supported by the resource.

34. A method according to claim 27 wherein the voltage profile determining comprises determining the time to change from one cycle period phase to another.

35. A method according to claim 27 wherein the voltage profile determining comprises converting the cycle period for each said phase into a voltage level for each said phase.

36. A method according to claim 31 wherein the metrics are the bounds of probabilities of each linear function.

37. A method according to claim 32 wherein the cycle period calculating utilises the following equation for determining the other cycle periods:

$$T_{FIXED} \cdot (C_c - C_b) \le \int_{C_b}^{C_c} k(y)dy =$$

$$\int_{C_b}^{C_c} \frac{A \cdot \left(\sqrt{1-cdf(y)}\right)}{\sum_{0<y\le WX} \sqrt{1-cdf(y)}} dy = T_{\max} \int_{C_b}^{C_c} \sqrt{1-cdf(y)}\, dy.$$

38. A method according to claim 33 wherein scaling the cycle period utilises the following equation:

$$K = \frac{A - T_{\text{fixed\_v}}^n (C_{n+1} - C_n)}{\sum_{i=0}^{i=n-1}(C_{i+1}-C_i)T_{fixed}^i} = \frac{A - T_{\text{fixed\_v}}^n (C_{n+1} - C_n)}{t_{n-1}}.$$

39. A method according to claim 34 wherein determining the time to change from one cycle period phase to another utilises the following equation:

$$t_i = \sum_{j=0}^{j=i-1} T_{fixed}^j (C_{j+1} - C_j).$$

40. A method according to claim 35 wherein converting the cycle period for each said phase into a voltage level for each said phase utilises the following equation:

$$T_{clk} \propto \frac{CV_{DD}}{(V_{DD}-V_{TH})^a}.$$

41. A method according to claim 36 wherein the metrics comprise a lower bound and an upper bound defining a predetermined percentage of the cycle counts in the distribution.

\* \* \* \* \*